United States Patent
Mori et al.

(10) Patent No.: US 11,327,034 B2
(45) Date of Patent: May 10, 2022

(54) MEASUREMENT DEVICE FOR ESTIMATING THERMAL CHARACTERISTICS, AND MEASUREMENT METHOD FOR ESTIMATING THERMAL CHARACTERISTICS BY USING SAME

(71) Applicants: TOYOTA JIDOSHA KABUSHIKI KAISHA, Toyota (JP); SULFUR CHEMICAL LABORATORY INC., Morioka (JP)

(72) Inventors: Kunio Mori, Morioka (JP); Takeshi Bessho, Susono (JP); Nobumasa Kimura, Kiyosu (JP)

(73) Assignees: TOYOTA JIDOSHA KABUSHIKI KAISHA, Toyota (JP); SULFUR CHEMICAL LABORATORY INC., Morioka (JP)

( * ) Notice: Subject to any disclaimer, the term of this patent is extended or adjusted under 35 U.S.C. 154(b) by 188 days.

(21) Appl. No.: 16/466,076

(22) PCT Filed: Dec. 12, 2017

(86) PCT No.: PCT/JP2017/044551
§ 371 (c)(1),
(2) Date: Jun. 3, 2019

(87) PCT Pub. No.: WO2018/110546
PCT Pub. Date: Jun. 21, 2018

(65) Prior Publication Data
US 2020/0064287 A1    Feb. 27, 2020

(30) Foreign Application Priority Data
Dec. 13, 2016 (JP) .............................. JP2016-240939

(51) Int. Cl.
*G01N 25/18* (2006.01)
*G01K 1/00* (2006.01)
*G01K 17/00* (2006.01)

(52) U.S. Cl.
CPC ..................................... *G01N 25/18* (2013.01)

(58) Field of Classification Search
USPC ................................ 374/43, 209, 29, 45, 51
See application file for complete search history.

(56) References Cited

U.S. PATENT DOCUMENTS 5,940,784 A * 8/1999 El-Husayni .......... G01N 25/005
                                                      702/130
6,142,662 A * 11/2000 Narh ...................... G01N 25/18
                                                      374/29

(Continued)

FOREIGN PATENT DOCUMENTS

CN    104312098 A  *  1/2015
EP     2418477 A1      2/2012

(Continued)

OTHER PUBLICATIONS

Translation on CN104312098A (Year: 2015).*

(Continued)

*Primary Examiner* — Mirellys Jagan
(74) *Attorney, Agent, or Firm* — Oliff PLC

(57) ABSTRACT

A measurement device for estimating thermal characteristics includes a heat generating source unit that has heat sensors for detecting heat radiating toward a measurement sample unit, and that heats the measurement sample unit, the measurement sample unit, and a heat cooling source unit that has heat sensors for detecting heat radiating from the measurement sample unit, and that cools the measurement sample unit, wherein those units are sequentially stacked, the measurement sample unit has a three-layer structure consisting of an object to be measured for estimating ther- (Continued)

mal characteristics, and heat conducting materials that sandwich the object, the heat conducting materials are adhered to the heat generating source unit and the heat cooling source unit one another through a heat-transfer promoting agent therebetween, the object to be measured for estimating thermal characteristics and the heat conducting materials are adhered to one another through physical contact, chemical contact, and/or chemical bond contact.

17 Claims, 8 Drawing Sheets

(56) References Cited

U.S. PATENT DOCUMENTS

| | | | |
|---|---|---|---|
| 6,331,075 B1 | 12/2001 | Amer et al. | |
| 6,896,405 B2 | 5/2005 | Osone et al. | |
| 2003/0072349 A1 | 4/2003 | Osone et al. | |
| 2006/0045165 A1* | 3/2006 | Chan | G01N 3/60 374/43 |
| 2007/0086504 A1* | 4/2007 | Chang | G01N 25/20 374/43 |
| 2010/0104871 A1 | 4/2010 | Hashimoto et al. | |

FOREIGN PATENT DOCUMENTS

| | | |
|---|---|---|
| JP | 2006-275713 A | 10/2006 |
| JP | 2006-291002 A | 10/2006 |
| JP | 3858660 B2 | 12/2006 |
| JP | 2007-070492 A | 3/2007 |
| JP | 2011-079872 A | 4/2011 |
| JP | 5509195 B2 | 6/2014 |
| JP | 2014-193808 A | 10/2014 |
| JP | 2016-128347 A | 7/2016 |
| KR | 101534296 B1 | 7/2015 |
| WO | 2010/103784 A1 | 9/2010 |

OTHER PUBLICATIONS

Sep. 20, 2020 Office Action issued in Korean Patent Application No. 10-2019-7016768.
Dec. 11, 2019 Search Report issued in European Patent Application No. 17881303.6.
Mar. 27, 2020 Search Report issued in European Patent Application No. 17881303.6.
Jun. 3, 2021 Office Action issued in Chinese Patent Application No. 201780076571.5.

* cited by examiner

Change of Measuring Temperature of Al 1mm / Silicone Rubber 1mm / Al 1mm Three-layer Structure

Change of Measuring Temperature of Cu 35μm / Heat Conducting Material 0.12mm / Cu Three-layer Structure

Change of Measuring Temperature of Cu 35μm / Heat Conducting Material 0.17mm / Cu Three-layer Structure

Al/Q/Al: 3 Interface Layers by Physical Contact
Al-Q/Al: 2 Interface Layers by Chemical Contact, then
2 Interface Layers by Physical Contact
Al-Q-Al: 3 Interface Layers by Chemical Contact Influence for Relationship between
Total Value of Thermal Resistance and
Thickness of Object to be Measured
with or without using Length Measuring Device
(Interface Pressure: 0.2MPa)

MEASUREMENT DEVICE FOR ESTIMATING THERMAL CHARACTERISTICS, AND MEASUREMENT METHOD FOR ESTIMATING THERMAL CHARACTERISTICS BY USING SAME

TECHNICAL FIELD

The present invention relates a observationally practicable measurement device for estimating thermal characteristics such as a value of contact thermal resistance for heat conducting materials contacted with both front and back surfaces, a value of thermal resistance and thermal conductivity of the heat conducting materials, which is suitable for practical, experimental or inspectional uses; a measurement method for estimating the thermal characteristics using same; a reducing agent for a value of interfacial contact thermal resistance consisting of a heat-transfer promoting agent; and a reducing method for a value of thermal resistance using it.

BACKGROUND OF THE ART

Some of technologies for important issues of the beginning of 21th century are heat control techniques. Thus heat control techniques are important for a large number of electronic or electric device for example light emitting elements such as LEDs, photoelectric conversion elements such as solar cells, thermoelectric conversion elements, wind turbine generation elements, printed circuit boards, semiconductor chips, electronic control elements or parts for various motors or engines of automobiles and so on. Products using those electronic or electric devices of recent years are easy to be affected by accepting self-generated heat while using thereof. And heat control directly affects efficiency or performance of the products increasingly. Therefore the heat control techniques are becoming essential ways and means for saving energy or further for maintaining environment of the earth. Additionally the tendencies thereto are accelerating even more because of necessity to promote thermal conduction at high speed with the time. It is required to develop and improve the heat control techniques more strongly, in views of decreasing the heat generated in the electronic or electric devices by heat radiation, and of constructing future society capable of exerting and maintaining of performance of efficiency of the product using electronic or electric devices.

However, problems for heat control, for example which factor is most important for decreasing heat temperature of the electronic or electric devices in industry or which properties among specific thermal characteristics are necessary to be estimated, have not yet explicitly indicated. Therefore it seems the thermal conductivity as mere one property of the thermal characteristics is recognized as important with its imaginary. Therefore developing only excellent heat conducting materials has been forced excessively, and it is fallen in a state of the proverb about "not seeing the wood for the trees". In order to solve the problems for estimating thermal characteristics comprehensibly and accurately, it is necessary to prepare or develop a measurement device for estimating thermal characteristics which is suitable for practical, experimental or inspectional uses and to investigate a measurement method for estimating thereof under policies based on how to use the heat conducting materials according to selection of estimating items among the thermal characteristics for matching practical, experimental or inspectional specimens.

The heat conducting materials are generally used by sandwiching between a heat generating source and a heat cooling source. Among the heat generating source, the heat conducting materials and heat cooling source, there are two layers of contact interfaces in those three members inevitably. And a value of thermal resistance (i.e. a value of contact thermal resistance) by contact is resided therein. When estimating the thermal characteristics thereof, there is no problem in case where the value of contact thermal resistance is conspicuously smaller than a value of thermal resistance of the heat conducting materials to be measured. However, when thickness of the heat conducting materials is 0.2 mm or less and is extremely thin, the value of contact thermal resistance affects total value of thermal resistance in those three members more than the thermal conductivity of the heat conducting materials in itself. In prior measurement devices for thermal conductivity, a value of contact thermal resistance has not made consideration. Pursuantly, when the heat conducting materials are used under a region of thickness in case of law thermal conductivity, any important information cannot be obtained except for an increase or decrease of the thermal conductivity from measurement results by using the prior measurement devices for thermal conductivity. It has not been generally understood that the value of contact thermal resistance should be important, further it has not yet been considerable. Therefore, it is found that preparing and developing a new measurement device and investigating a measurement method for estimating the thermal characteristics, which are able to accurately estimate the thermal characteristics including a value of contact thermal resistance, are absolutely imperative for development of heat conducting materials or design of heat control.

The prior measurement devices for thermal conductivity can measure the thermal conductivity by a unidirectional heat flow steady state comparison method in which a heating block is provided in the superior region and a cooling block is provided in the inferior region, and a test piece is sandwiched between metallic blocks having high thermal conductivity and further more sandwiched between rods having known thermal conductivity, and then heat is unidirectionally flowed while just applying a load among a heat generating source, the heat conducting materials and a heat cooling source. For example, when two pieces (surface roughness: 10-40 nm) of Al plates (thermal conductivity: 240 W/mK) or Cu plates (thermal conductivity: 403 W/mK) having high thermal conductivity are stacked, thermal conductivity among those metal is extremely low. Even when an applied load is merely 0.01-1 MPa, that of the former is 0.54-0.84 W/mK and that of the latter is 0.38-0.80 W/mK. When an adequate load (0.3 MPa) is applied thereto, thermal conductivity between both stacked metallic plates is low beyond our wildest imagination and real estimation of thermal characteristics cannot be performed. And it is realistically difficult to keep on applying a load of high contact pressure such as 1 MPa constantly and evenly, and correct thermal characteristics cannot be estimated. Those cases show that high thermal conductivity for the sole heat conducting material can be indicated while extremely-low thermal conductivity for the stacked heat conducting materials can be indicated. Low of real contact area among solid materials or metals such as Al plates or Cu plates causes thus results. Therefore estimation of the heat conducting materials by only thermal conductivity is not any meaningful information for products or parts installed into electronic or electric devices in which the heat conducting materials are coupled and used therefor. It seems that the estimation of heat conducting materials by only thermal conductivity is insignificant, when estimating heat radiation for coupled parts of electronic devices or electronic members through thermal diffusion. Those cases suggest that even if a heat radiation material for heat conducting materials having high thermal conductivity is used for heat radiation materials of electronic devices or electronic members, the heat conducting materials may not contribute to exercise high efficiency or high performance with keeping cold episode through heat radiation.

Still, as parts units of componentry materials for being aimed to declining temperature by heat conduction in electronic or electronic devices that have generally-applicative heat radiation materials, one unit essentially consists of at least three layers structure member (i.e. three-layer structure) having a heat-conductive metallic layer (a solid material) at a side of a heat generating source/a heat conducting material (a sheet material)/a heat-conductive metallic layer (a solid material) at a side of a heat cooling source. Therefore, a value of thermal resistance or thermal conductivity of the aimed heat conducting material and a value of contact thermal resistance which is reflected in real contact area thereof are imperative items of measuring and estimating thereof in measurement for estimating thermal characteristics. Additionally, in order to inflict those items of estimating thereof on meaningful values, it is necessary to indicate thus obtained values as units which show mean values of thermal characteristics, to measure the thermal characteristics after constructing the componentry materials or parts into a rational equipment so as not to use a value of thermal resistance whose unit is unclear (ex. unit of K/W), and to show certainty without dubiety.

For the three layers structure member, it is important to assume existence of contact layers between the metallic layer (the solid material) at the side of the heat generating source/the heat conducting material layer/the metallic layer (the solid material) at the side of the heat cooling source, to obtain the value of contact thermal resistance, the value of the sheet thermal resistance and the value of the sheet thermal resistance of the heat conducting material on each of the contact layers which contact respectively, and to conduct reasonably mathematization thereof after assuming a value of contact thermal resistance, thermal conductivity and thickness of contact interface of the contact layers of the three layers structure member.

For development of meanings to estimate a value of thermal resistance on each layers between the metallic layer (the solid material) at the side of the heat generating source/ the heat conducting material/the metallic layer (the solid material) at the side of the heat cooling source, to determine occasions which cause high value of thermal resistance, and to reduce the value of thermal resistance, development of new invention of a measurement device for estimating thermal characteristics which can accurately measure those values, and new devisal of measuring and estimating thermal characteristics are indispensable. However, as of now, there is no measurement device and method for estimating thermal characteristics which coincide with thus purposes.

Heretofore, measurement devices for thermal conductivity are known as devices for measuring physical property values on heat conduction of an object to be measured such as a resin material by using a unidirectional heat-flux steady comparison method, as shown in below patent documents 1 and 2. The measurement devices shown in those patent documents have a layered structure in which an object to be measured is sandwiched with a pair of members (i.e. holding members), and further have a feature in which the layered structure is sandwiched with an upper rod and a lower rod. A heat generating source is embedded in the upper rod, and the upper rod is configured so that it enables to measure temperature at plural points in the longitudinal direction. Comparatively, a cooling device is connected to the lower rod, and the lower rod is configured so that it enables to measure temperature at plural points in a longitudinal direction. The heat generating source, the heat cooling source and temperature measurement instruments are regardfully set at a near position from a sample to be measured. Although a lot of points for measurement is appropriate in the context of ensuring dependability of data, those points cause hindrance strikingly in taking the sample into or out or cleaning contacting portions in many instances.

The measurement devices can measure thermal resistance of the layered structure (i.e. the object to be measured: the sample to be measured for thermal characteristics) by heating it under loading by the upper rod and lower rod, and measuring the temperature at the plural positions on the upper rod and lower rod. And the thermal resistances of each holding members are preliminarily measured as preliminary examination, and the thermal resistances of contact interface between the holding members and the upper rod or the lower rod. A value of thermal resistance of resin materials including the thermal resistance of the contact interface between the holding members and the object to be measured can be determined by subtracting the value of thermal resistance obtained in the preliminary examination from the value of thermal resistance of the layered structure. However a value of thermal resistance of the contact interface cannot be measured by using the measurement devices. Conditions of metallic surfaces connected to the sample to be measured are varied under each usage thereof, therefore the same value of thus thermal characteristics beforehand obtained by the preliminary examination cannot all be always used. Scratches or damages may accrue on the surfaces of the rods by taking in or out the object to be measured, and then the real contact area may tend to be reduced depending on number of measurement. Therefore there is discrepancy originally in which accurate values of the thermal characteristics cannot be obtained.

And the patent document 1 discloses that release of heat to the environment can be prevented by covering all of the upper rod, the layer structure and the lower rod with a heat insulation material, or by installing them in a thermostatic oven. Thus attention does not matter, unless abnormal movement of air is generated around the metallic materials.

Furthermore, as described above, the preliminary examination is required for preliminarily measuring a value of thermal resistance of the holding members themselves and a value of thermal resistance of the contact interface between the holding members and the upper rod or the lower rod, in order to determining the value of the thermal resistance of the object to be measured by the measurement device disclosed in the patent document 1. Therefore, the patent document 2 discloses that not only the procedures for measurement are tangled, but also measurement time is protracted. If a value of thermal resistance of the contact interface is given as a value without dependence on temperature, pressure and time, there is no problem. However, the patent document fails to disclose devisal or experiments thereof.

And in patent document 2, three pairs of thermocouples having total 6 channels are above and below inserted on temperature measurement instruments (the holding members) blocks. And according to thus structure, only specific materials, which is coated thereon with the sample to be measured, and is treated with a dry procedure and a fair surface procedure, or restricted methods thereof must be used for determination thereof. Furthermore, procedures of preparing or measuring the sample are extremely tangled. When blocks having high thermal conductivity (for example, Al) are used, temperature difference between crosswise points within 1 cm is extremely small. The measured values can be easily calculated from particular values of thermal resistance or thermal conductivity of Al. Additionally, errors between the measured values and the particular values are extremely small, and contact interface thermal resistance between metals is remarkably large. Therefore, above-mentioned attention is meaningless.

When using a measurement device for estimating thermal characteristics by using a unidirectional heat flow steady state comparison method in case when metallic blocks of copper or aluminum sandwiching an inserted sample to be measured contact with the complexed object to be measured consisting of resin materials and ceramic powder having high hardness such as MgO, $Al_2O_3$, AlN, BN, $C_3N_4$, $Si_3N_4$ and so on, measurement of accurate thermal characteristics is detracted. In the case, troublesome task may be taken due to increasing roughness through scratches on surfaces of the metallic blocks during taking it out at measurement or the adhered sample to be measured, attrition during cleaning, and removal of firmly fixed scaffoldings from the sample to be measured. Further, the measuring time is significantly extended and real contact area is reduced simultaneously. Additionally, time and cost have to be spent for replacement of the thermocouples and connectors thereof because they are fixed.

As mentioned above, direct measurement of the sample to be measured causes difficulty for measurement of the value of contact interface thermal resistance, and additionally it often throws away time and cost. Since an investigation speed of development of an improvement method for a value of contact thermal resistance or development of low thermal resistance materials (excellent heat conducting material) may be retarded, the measurement of the value of contact thermal resistance is essential item for a measurement device which should solve them. Because a value of contact interface pressure for measurement between metals and a value gap length located on a heat transfer pass between the metals and the object or between the objects to be measured will be large, it is important that influence of them in view of the value of contact thermal resistance on the contact interface should be reduced as little as possible.

Furthermore, three thermal characteristics of a value of contact thermal resistance, a value of thermal resistance and thermal conductivity of an object to be measured, all which are necessary to estimate thermal characteristics, are not determined by measurement thereof according to the patent document 2. Additionally, it is impossible to measure them of a sample object to be measured having complex surface shape according to the patent documents 1 and 2. And measurement for a steric three layered structure of an existent heat conducting material, preparation or measurement of interlaminar contact samples (physical contact, chemical contact or chemical bond contact samples) are not sufficient. Therefore, they are not dissatisfied with factors for a practical device, an experimental device or an inspectional device, especially an experimental instalment for heat control.

PRIOR ART DOCUMENT

Patent Document

[Patent Document 1] Japanese Patent Publication No. 3858660B

[Patent Document 2] Japanese Patent Publication No. 5509195B

SUMMARY OF THE INVENTION

Problems to be Solved by the Invention

The present invention was made in view of solving the above described problems. Its object is to provide a measurement device for estimating thermal characteristics by using a unidirectional heat flow steady state comparison method, and a measurement method for estimating thermal characteristics of a determination method for a value of contact thermal resistance of an object to be measured, a value of thermal resistance and thermal conductivity of the object to be measured having various thickness thereof by using the measurement device. The present invention demands that dependability of the measurement device for various object to be measured can be ensured and results of measuring and estimating the thermal characteristics for practical, experimental or inspectional purposes can be obtained in a short time by an interface pressure dependency evaluation of the object to be measured, by a heat contact technique for the object to be measured, by a heat transfer acceleration technique between the objects to be measured and by heat measurement and analysis technics of them. And another object is to provide a heat radiation method establishing high heat radiation by using a layered structure of the object to be measured for estimating the thermal characteristics, which is developed by thus measurement and then selected. And other object is to provide a reducing agent for a value of interfacial contact thermal resistance comprising a heat-transfer promoting agent, and a reducing method for a value of thermal resistance by using it, which are used for the measurement device for estimating thermal characteristics or the measurement method for estimating thermal characteristics.

The measurement device for estimating thermal characteristics can determine thermal conductivity from measurement results of a value of contact thermal resistance and a value of thermal resistance of the object to be measured. It requires that average and fruitful values as those value can be obtained.

The measurement device for estimating thermal characteristics requires that it is assembled by individual parts thereof so that heat and stress are adequately transferred from upper portion to lower portion. It is necessary to select and use physical contact and chemical contact according to purpose for the individual parts of the measurement device for estimating thermal characteristics on respective portions each other.

And it is important to select for measuring positions so that a heat generating source and a heat cooling source should be set at closest position from the object to be measured in the measurement device for estimating thermal characteristics.

The most important problem to be solved by the present invention is form of the object to be measured. The object may be assorted form such as tenacious material (ex. compound and grease and so on), a solid sheet or a variant individual having concavity and convexity. It is necessary to develop and investigate usage of the heat conductive object to be measured for practical, experimental or inspectional purposes concurrently. And additionally, it is important that constant shapes of the samples of the objects to be measured are standardized. It is necessary to devise measurement for generic and average value of the thermal characteristics, because particular measurement in case of the object to be measured having complex shapes for final products may be required.

The object to be measured is measured under an insert condition depend upon the practical, experimental or inspectional purposes by using the measurement device for estimating thermal characteristics, and is taken out or is cleaned. In the cases, it is necessary to prevent interference of dependability of the measured values after accidents damaging an object to be contacted by the object to be measured or varying roughness.

Hereat, it is necessary to devise insert procedure of the object to be measured which is easy in using the measurement device for estimating thermal characteristics, and not to cause variation of the thermal characteristics which may occur by repeat of the insert procedures. The damage on a heat transfer surface or a heat cooling surface in the measurement device for estimating thermal characteristics certainly occurs as long as the measurement conducted repeatedly. Therefore, there is a major problem that it is impossible for the selection of a low abrasion material to deal with it.

And in conventional measurement method, thickness measured before measurement of the thermal characteristics is used as thickness of film sheet or plate of the object to be measured. However, the actual thickness of film and so on of the sample to be measured, changes in accordance with variation of the interface pressure. The thinner sample is used, the larger amount of the change at this time is occurred. It cannot be expressed as an accurate value of thermal resistance. Therefore, it is necessary to interlock the change of the interface pressure and the thickness of the sample.

It is important to consolidate the object to be measured into the construct having constant form, besides above-mentioned problems. Furthermore, there is an additional problem to reduce a value of contact thermal resistance which is generated at a contact interface between the construct of the object to be measured and a heat transfer surface or a heat cooling surface, and is generated at a contact interface between the construct and the object to be measured.

Although the real contact area fluctuates in accordance with roughness, wrest or distortion of an interfacial surface on which a face of the object to be measured contacts to other face according to load, it is not easy to keep 1% or more actually. Since it is natural to have roughness on the surface, development of a method for embedding roughness is also important challenge. The method for measure value of contact thermal resistance, which is generated by a gap of the interfacial surface, is important.

And in the measurement device for estimating thermal characteristics, there are thermal physical contacts throughout, furthermore a value of contact thermal resistance is generated thereby. The measurement device for estimating thermal characteristics needs to be devised to reduce thermal physical contact so that the value of contact thermal resistance does not become a fruitful value against a value of thermal characteristics. The measurement device for estimating thermal characteristics needs workings which make interface pressure vary on the object to be measured in order to detect change of thermal resistance by physical contact. An indispensable task is to devise that the values of thermal characteristics do not depend upon the interface pressure or the surface roughness at a contact joining section of the object to be measured and parts of the measurement device for estimating thermal characteristics.

Up until now, any documents fail to disclose devisal that removes or reduce factors located in the contact interface such as air and bubble or surface roughness, which strongly influence value of contact thermal resistance, and means for solving the problems.

Also, the measurement device for estimating thermal characteristics needs devisal that prevents to diffuse heat to outside through a measurement unit during measurement. It is an important problem for determine an accurate value of the thermal characteristics.

In the measurement device for estimating thermal characteristics, it is necessary to add important functions for a unidirectional heat flow steady state comparison method such as shortening of time for measurement, constructing an indicating or diagrammatizing system of the measurement data.

And those points are needed as well as for a measurement method for estimating thermal characteristics using the measurement device for estimating thermal characteristics, for a reducing agent for a value of interfacial contact thermal resistance comprising a heat-transfer promoting agent, and for a reducing method for a value of thermal resistance by using it.

Means for Solving Problems

A measurement device for estimating thermal characteristics of the present invention developed to achieve the objects described above comprises:

a heat generating source unit that has heat sensors for detecting heat radiating toward a measurement sample unit, and that heats the measurement sample unit;

the measurement sample unit;

a heat cooling source unit that has heat sensors for detecting heat radiating from the measurement sample unit, and that cools the measurement sample unit; and a support unit that is provided for them, wherein those units are sequentially stacked, the measurement sample unit has a three-layer structure consisting of an object to be measured for estimating thermal characteristics, and heat conducting materials that sandwich the object, the heat conducting materials are adhered to the heat generating source unit and the heat cooling source unit one another through a heat-transfer promoting agent therebetween, the object to be measured for estimating thermal characteristics and the heat conducting materials are adhered to one another through physical contact, chemical contact, and/or chemical bond contact.

It is preferable that the measurement device for estimating the thermal characteristics comprised a length measuring device which measures thickness of the measurement sample unit and/or the object to be measured for estimating thermal characteristics so that an interface pressure is changed in conjunction with thickness of the sample to be measured.

The measurement device for estimating the thermal characteristics may comprise a load unit which is provided with a load measurement device, and which applies a load onto the measurement sample unit.

It is preferable that in the measurement device for estimating the thermal characteristics, the load unit has a load cell that conducts the load onto the object to be measured for estimating thermal characteristics, and a circuit that converts deformation which is detected in the load cell by the load measurement device into a voltage.

It is preferable that in the measurement device for estimating the thermal characteristics, the heat generating source unit consists of a heat insulation material, a heat generating source that indwells with joining to an insulating resin which contacts the heat insulation material, and a metallic block which contacts the insulating resin at a side of the measurement sample unit, the heat insulation material, the heat generating source and the metallic block are sequentially stacked, and contacting thereof is bonding by a molecular adhesive agent.

In the measurement device for estimating the thermal characteristics, the measurement sample unit may be the three-layer structure consisting of the heat conducting materials of two metallic plates, and the object to be measured for estimating thermal characteristics sandwiched therebetween, and they may be adhered through the physical contact, the chemical contact, and/or the chemical bond contact.

In the measurement device for estimating the thermal characteristics, thermal spaces, which have a permissible value of thermal resistance, a permissible affectedness of volatility, independence of pressurization, and/or independence of distance of a gap, may be provided between the measurement sample unit and a metallic block in the heat generating source unit which contacts thereto, and between the measurement sample unit and a metallic block in the heat cooling source unit which contacts thereto.

In the measurement device for estimating the thermal characteristics, thermal spaces, which have a permissible value of thermal resistance, a permissible affectedness of volatility, independence of pressurization, and/or independence of distance of a gap, may be provided between the heat conducting material in the measurement sample unit and a metallic block in the heat generating source unit which contacts thereto, and between the heat conducting material in the measurement sample unit and a metallic block in the heat cooling source unit which contacts thereto, and the thermal spaces may be filled with the heat-transfer promoting agent.

In the measurement device for estimating the thermal characteristics, the heat conducting materials and the object to be measured for estimating thermal characteristics may be adhered through the chemical contact through a heat-transfer promoting agent and/or the chemical bond contact through a molecular adhesive agent.

In the measurement device for estimating the thermal characteristics, it is preferable that the heat-transfer promoting agent includes: high purity water selected from heavy water, distilled water and ion-exchanged water; a surface active agent selected from a cationic surfactant, a nonionic surfactant, an anionic surfactant, and an ampholytic surfactant; preferably a water-soluble polymer selected from carboxy methyl cellulose, polyethylene glycol, and polyvinyl alcohol; a builder selected from sodium sulfate, sodium sulfite, sodium carbonate, ammonium sulfite, ammonium carbonate, sodium phosphate, sodium silicate, ammonium silicate, ammonium phosphate, sodium phosphite, ammonium phosphite, sodium nitrate, sodium nitrite, ethylenediaminetetraacetic acid, ethylenediamine, diethylenetriamine, triethylenetetaramine and ammonium ethylenediaminetetraacetate; a metallic surface stabilizer selected from triazine trithiol metallic salt, benzotriazole hydrochloride, ethylenediaminetetraacetic acid, ethylenediaminetetraacetic acid-lactic acid, resorcin, t-butylphenol, and aminophenyl aniline. It may include at least water and 2 ingredients of the surface active agent.

In the measurement device for estimating the thermal characteristics, for example, the measurement sample unit is the three-layer structure, and the object to be measured for estimating thermal characteristics is a piece or plural pieces of measuring sheets having 0.001 mm to 20 mm of thickness per piece.

In the measurement device for estimating the thermal characteristics, for example, the measurement sample unit has single set or stacked plural sets of the three-layer structure in which the object to be measured for estimating thermal characteristics is sandwiched between the heat conducting materials.

In the measurement device for estimating the thermal characteristics, for example, the object to be measured for estimating thermal characteristics in which a sample is embedded in a hardened material from an un-crosslinked liquid-silicone liquiform rubber composition and the heat conducting materials are adhered through the physical contact, the chemical contact, and/or the chemical bond, is contact in the measurement sample unit.

In the measurement device for estimating the thermal characteristics, the object to be measured for estimating thermal characteristics, in which a sample is embedded in a hardened material from an un-crosslinked liquid-silicone liquiform rubber composition and the heat conducting materials are adhered through the physical contact, the chemical contact, and/or the chemical bond, is contacted in the measurement sample unit, and the measurement sample unit has single set or stacked plural sets of the three-layer structure.

In the measurement device for estimating the thermal characteristics, the measurement device is used for measuring a value of contact thermal resistance between the object to be measured for estimating thermal characteristics and the heat conducting materials in the three-layer structure, and value of thermal resistance and thermal conductivity of the object to be measured for estimating thermal characteristics, as bog-standard values of an identical object to be measured for estimating thermal characteristics, thickness of the object to be measured for estimating thermal characteristics is ranging within 0.001 to 10 mm per piece thereof, the values of contact thermal resistance and thermal resistance of the object to be measured for estimating thermal characteristics are ranging within $0.0001*10^{-3}$ $m^2$ K/W to 1 $m^2$ K/W and the thermal conductivity of the object to be measured for estimating thermal characteristics is ranging within 0.01 W/mK to 20 W/mK.

In the measurement device for estimating the thermal characteristics, the measurement device is used for measuring a value of contact thermal resistance between the object to be measured for estimating thermal characteristics and the heat conducting materials in the three-layer structure, and value of thermal resistance and thermal conductivity of the object to be measured for estimating thermal characteristics, as bog-standard values of an identical object to be measured for estimating thermal characteristics stacked plural sets of the three-layer structure are stacked at most 5 units, and an applied layer of the heat-transfer promoting agent having 5 mg/4.84 $cm^3$ to 20 mg/4.84 $cm^3$ is provided between the object to be measured for estimating thermal characteristics and the heat conducting materials, and between the plural units of the three-layer structure, and the value of thermal resistance is total value of thermal resistance of the objects to be measured for estimating thermal characteristics within a range of 0.01 MPa to 3 MPa of pressure of contacted surface on the stacked plural sets of the three-layer structure.

A measurement method for estimating thermal characteristics of the present invention developed to achieve the objects described above comprises:

measuring the thermal characteristics of a value of contact thermal resistance, a value of thermal resistance, and thermal conductivity by using:
- a measurement device for estimating thermal characteristics comprising;
  - a heat generating source unit that has heat sensors for detecting heat radiating toward a measurement sample unit, and that heats the measurement sample unit;
  - the measurement sample unit;
  - a heat cooling source unit that has heat sensors for detecting heat radiating from the measurement sample unit, and that cools the measurement sample unit; and
  - a support unit that is provided for them,
  - wherein those units are sequentially stacked,
- wherein the measurement method includes;
- adhering the heat conducting materials to the heat generating source unit and the heat cooling source unit one another through a heat-transfer promoting agent therebetween,
- preparing a three-layer structure consisting of an object to be measured for estimating thermal characteristics, and heat conducting materials that sandwich the object so that the measurement sample unit has the three-layer structure,
- adhering the object to be measured for estimating thermal characteristics to the heat conducting materials one another by physical contact, chemical contact, and/or chemical bond contact, and then,
- measuring the thermal characteristics.

A heat radiation method on the measurement method for estimating thermal characteristics of the present invention developed to achieve the objects described above comprises:

radiating heat in a three-layer structure, which is extracted from a cohort of manufacturing lots thereof or any one of the cohort of manufacturing lots and is measured, and which consists of an object to be measured for estimating thermal characteristics, and heat conducting materials that sandwich the object through a physical contact, chemical contact, and/or chemical bond contact to adhere them, wherein the three-layer structure is sandwiched between a heat generating source material and a heat cooling source material, and is used for a portion in any one selected from an electric material, an electronic material, a printed-wiring assembly for a semiconductor component, a motor, a lighting equipment, an automobile supply, and a radiating material.

A reducing agent for a value of interfacial contact thermal resistance of the present invention developed to achieve the objects described above comprises a heat-transfer promoting agent, wherein the heat-transfer promoting agent includes:
high purity water selected from heavy water, distilled water and ion-exchanged water, and
at least any one of a surface active agent selected from a cationic surfactant, a nonionic surfactant, an anionic surfactant, and an ampholytic surfactant; a water-soluble polymer selected from carboxy methyl cellulose, polyethylene glycol, and polyvinyl alcohol; a builder selected from sodium sulfate, sodium sulfite, sodium carbonate, ammonium sulfite, ammonium carbonate, sodium phosphate, sodium silicate, ammonium silicate, ammonium phosphate, sodium phosphite, ammonium phosphite, sodium nitrate, sodium nitrite, ethylenediaminetetraacetic acid, ethylenediamine, and ammonium ethylenediaminetetraacetate; a metallic surface stabilizer selected from triazine trithiol metallic salt, benzotriazole hydrochloride, ethylenediaminetetraacetic acid, ethylenediaminetetraacetic acid-lactic acid, resorcin, t-butylphenol, and aminophenyl aniline.

A reducing method for a value of thermal resistance of the present invention developed to achieve the objects described above comprises:

using a heat-transfer promoting agent as a medium that includes:
high purity water selected from heavy water, distilled water and ion-exchanged water, and
at least any one of a surface active agent selected from a cationic surfactant, a nonionic surfactant, an anionic surfactant, and an ampholytic surfactant; a water-soluble polymer selected from carboxy methyl cellulose, polyethylene glycol, and polyvinyl alcohol; a builder selected from sodium sulfate, sodium sulfite, sodium carbonate, ammonium sulfite, ammonium carbonate, sodium phosphate, sodium silicate, ammonium silicate, ammonium phosphate, sodium phosphite, ammonium phosphite, sodium nitrate, sodium nitrite, ethylenediaminetetraacetic acid, ethylenediamine, and ammonium ethylenediaminetetraacetate; a metallic surface stabilizer selected from triazine trithiol metallic salt, benzotriazole hydrochloride, ethylenediaminetetraacetic acid, ethylenediaminetetraacetic acid-lactic acid, resorcin, t-butylphenol, and aminophenyl aniline, interposing the heat-transfer promoting agent between a joining material and a joined material which are solid and consists of different materials each other, reducing thermal resistance, and/or reducing or canceling thermal noise, and reducing or canceling the value of thermal resistance thereby.

In that the reducing method for the value of thermal resistance, it is preferable that the joining material and the joined material are made each other from the different materials which are selected from:

at least any one of inorganic materials selected from a metallic material, a metallic alloy material, a ceramic material and a compound semiconductor; organic materials; and composite materials consisting of the organic materials and the inorganic materials.

It is preferable that in the reducing method for the value of thermal resistance, a three-layer structure is constituted with two pieces of the joining material consisting of heat conducting materials, and the joined material sandwiched therebetween, the heat-transfer promoting agent is preliminarily filled in thermal spaces between the joining material and the joined material.

Effects of the Invention

The present invention has the following enumerated features. It enables to measure the thermal characteristics of the object to be measured to practical, experimental or inspectional levels, and to develop new heat conducting materials or a heat-transfer promoting agent for contact interface, and new method for estimating thermal characteristics.

(1) A measurement device for estimating thermal characteristics enables to determine an average value of thermal characteristics consisting of a value of contact thermal resistance on the contact interface, an accurate value of thermal resistance and accurate thermal conductivity for practical, experimental or inspectional levels of an object to be measured. It enables to measure them with high accuracy correlativity as 0.97 or more of correlation coefficient thereof.

(2) The measurement device for estimating thermal characteristics easily and definitely enables to measure the accurate thermal characteristics to be coincident with practical, experimental or inspectional usage, by using single set or stacked plural sets of multilayer structure having at least three layers consisting of a heat conducting material (a metallic plate)/an object to be measured/a heat conducting material (a metallic plate).

(3) The measurement device for estimating thermal characteristics enables to vary interface pressure between each contact in or in-between the three-layer structure by load, and enables to measure thermal characteristics depend on or not depend on the interface pressure.

(4) According to the measurement device for estimating thermal characteristics, influences of roughness of the contact interface and the contact pressure may be remarkably reduced by application or interposition of a heat-transfer promoting agent on each contact interface of the object to be measured and/or the three-layer structure having it.

(5) When using the measurement device for estimating thermal characteristics, the heat-transfer promoting agent is a solution having low viscosity without air bubble which may comprise pure water or heavy water, a surface active agent, a builder and a stabilizer, and is easy to be applied, intermediated or removed.

(6) The measurement device for estimating thermal characteristics enables control dependence or independence property of the interface pressure by constructing physical contact, chemical contact, or mixed contact of physical contact and chemical contact for surface contact of the object to be measured and/or the three-layer structure having it.

(7) When one or both of two interface layers in the three-layer structure are contacted by chemical bonds, thermal characteristics can be improved.

(8) When the measurement device for estimating thermal characteristics has a length measuring device, thickness of the samples as the object to be measured can be definitely determined with micro meter order at the time of the measurement. Therefore accurate thickness and thermal characteristics of the objects to be measured, which are samples having wide range hardness and are exemplified with a soft sample or a solid sample, can be measured.

(9) A unidirectional heat flow steady state comparison method takes long time as disadvantage. According to the measurement device for estimating thermal characteristics, thus time for measurement can be remarkably reduced because the heat-transfer promoting agent intermediated on the contact interface layers can come up to a steady state in short time.

(10) The heat-transfer promoting agent may be used as a reducing agent for a value of interfacial contact thermal resistance for not only shorting the coming up time to the steady state during measurement of the thermal characteristics using the measurement device for estimating thermal characteristics, but also controlling temperature increase of LED luminous source which is weak for heat, a laser oscillator, and a semiconductor device.

According to the present invention of the measurement device for estimating thermal characteristics of the present invention with using the unidirectional heat flow steady state comparison method, and the method measurement method for estimating thermal characteristics by using it, the measurement can be accurately and adequately performed by setting the objects to be measured with various thicknesses between the heat generating source and the heat cooling source of the measurement device for estimating thermal characteristics, and concomitantly connecting a system which measures and analyzes temperature difference of both to the measurement device for estimating thermal characteristics, in order to determine or measure and estimate the value of contact thermal resistance on the contact interface of the object to be measured, and the value of thermal resistance and thermal conductivity of the objects to be measured with various thicknesses. And concurrently, a coefficient of correlation between the value of thermal resistance and the thickness of the object to be measured for estimating thermal characteristics is 0.97 or more as high correlativity, thereby.

And according to the measurement device for estimating thermal characteristics, thermocouples applied with a thermally conductive grease are respectively inserted into a metallic block contacted to the heat generating source and a metallic block contacted to the heat cooling source, for example into two holes, signals converted from temperature to voltage are outputted to the associated system for acquisition and control of data, and results thereof is projected on a computer display through interface units. In this instance, the measurement thereof can be performed by using at least one pair of thermocouple on up and down sides among each two thermocouples. However, when 4 or more thermocouples are used to check thermo-control or thermo-change in the metal, accuracy thereof is improved more.

In the measurement device for estimating thermal characteristics, contacting portions of respective parts may be bonded by molecular adhering technology so as to adequately conduct heat or stress from upper portion to lower portion. When continuous contact are configured by chemical bonding between those parts thereby, the stress between respective parts can be resiliently conducted between respective parts according to Hooke's law and also heat can be efficiently conducted simultaneously. Hereby, construction of the measurement device for estimating thermal characteristics can be ready to enable to measure the thermal characteristics accurately and adequately.

Rational arrangement for conducting the heat from the heat generating source unit to the object to be measured and for cooling the heat on the heat cooling source unit is achieved by configuring the three layers structure, in which the object to be measured is located between the heat generating source unit and the heat cooling source unit.

After the location of the object to be measured is decided in the measurement device for estimating thermal characteristics, next important factor is characteristics of the object to be measured. The characteristics of the objects to be measured are variform, and are exemplified with a viscous form (ex. a compound or a grease), a solid sheet, a variant solid having concavity and convexity. Therefore, it is important to standardize thus characteristics by identical procedures and as well as simple means. In the measurement device for estimating thermal characteristics of the present invention, the form is standardized as the three layers structure in which the object to be measured is sandwiched between two metallic plates, to achieve the purposes. Otherwise, the form is standardized as the three layers structure by casting the object to be measured having complex shapes with a liquid composition including a non-crosslinking silicone rubber to form a crosslinked silicone rubber having a rectangular parallelepiped shape. When thus three layers structure is used for the objects to be measured by using the measurement device for estimating thermal characteristics standardization of samples to be measured may be realized, and the thermal characteristics of the objects to be measured having various configuration or shapes may be definitely and adequately measured by using the same measurement device for estimating thermal characteristics.

When the three layers structure or multi sets of the three layers structure are prepared by using different objects to be measured and the thermal characteristics are measured by the measurement device for estimating thermal characteristics and then 3 or more points of relation between a measured value of thermal resistance (Rt) and thickness (L) of the object to be measured are plotted, Rt=aL+b as an expression of a linear function is obtained. In the expression, the contact thermal resistance of contact interface between the object to be measured and the heat conducting materials (metallic plates) meets b, and the value of thermal resistance of the object to be measured is expressed by Rt−b and the thermal conductivity of the object to be measured is expressed by a=L/(Rt−b). Since coefficient of correlation of three plotting points is kept at 0.97 or more in this case, the accuracy of the values of the measurement are ensured.

The damage of a surface of heat conduction or a surface of heat cooling in the measurement device for estimating thermal characteristics is inevitably occurred as long as measurements are repeated by using the same measurement device. Therefore, there is a major problem which is unsolvable by only selection of a low abrasive material. It is necessary to standardize the certain form in order to apply heat to the object to be measured in the measurement device for estimating thermal characteristics of the present invention. In cases when the objects to be measured are physically contacted to a heat conduction surface and a heat cooling surface of the measurement device for estimating thermal characteristics in order to be measured, it is important that meanings for providing a correction mechanism is constructed even if the heat conduction surface and the heat cooling surface are damaged and then heat conduction levels thereof may be changed by the concavity and convexity of formed scratches. For dissolving thus problems, the sole object to be measured or the three layer-structure, in which the object to be measured is sandwiched heat conducting materials such as metallic plates, is employed. Therefore, thermal characteristics are accurately and adequately measured through solving the problems for important factors of the heat-transfer by markedly reducing the value of contact thermal resistance in applying a heat-transfer promoting agent on the surface of the metal side and the surface of the object to be measured.

Employment of the three-layer structure is effective in order to extremely simplify to demount the sample to be measured and to significantly save the trouble for cleaning, while moderate scratches cannot be avoided on the heat conduction surface and the heat cooling surface of the measurement device for estimating thermal characteristics. However, the thermal characteristics can be accurately and adequately measured repeatedly through new meanings by using the heat-transfer promoting agent which intermediates in gaps between the interfacial surface layers of them in order to maintain a heat-transfer speed in spite of changes of roughness of the surfaces by the scratches.

The heat-transfer promoting agent can be easily wiped off under 10 P or less of absolute viscosity, and does not make the surfaces damage by cleaning the heat conduction surface and the heat cooling surface with volatile organic solvents. Thereby, the thermal characteristics can be accurately measured. The major component of the heat-transfer promoting agent may adequately be pure water (4.217 J/gK; i.e. ca 4.19 J/cal, 1 cal/g° C.) or deuterated water whose molecular weight is global minimum and specific heat is higher. If the heat-transfer promoting agent consists of sole pure water, it is easy to be vaporized and cannot completely compensate the concavity and convexity. Therefore, coexisting vehicles are effective for ingredients of the heat-transfer promoting agent for gaps between metals. Thus coexisting vehicles are exemplified with a surface active agent or a builder that is able to prevent volatilization of the water and to remove minute bubbles attached onto a wall of clearance gaps between contact interfaces and generated by roughness of the surfaces, and/or beneficial compounds for antirust purposes of the metal.

For the measurement using the measurement device for estimating thermal characteristics, it is important to know how pressure are needed for keeping the thickness of the interface layers located around the object to be measured, or the real contact area as constant values, in order to investigate to reduce the value of thermal resistance. Therefore, it is preferable to detect distortion thereof. For example, the load of the unit and the distortion caused thereby are measured by a load measurement device. In the case, a pressure of the contact interface on the three-layer laminated structure is gotten to a distortion gauge by using a screw coupler or a step motor. The value thereof can be detected by a distortion measuring unit, and is accurately and adequately reflected for measurement of the thermal characteristics.

By thus load pressure on the surface, the thickness of the object to be measured may be changed. In the case, it is necessary to measure the change of the pressure on the surface and thickness of the object to be measured simultaneously, and to correct the thickness to original thickness of the object to be measured. For the purpose, it is necessary to use a length measuring device.

They are measured by the measurement device for estimating thermal characteristics in a transparent plastic case made from an acryl resin in order to prevent to diffuse the heat to the measurement unit or to conduct and diffuse the heat via the measurement unit to outside thereof during measurement. And when the body of the measurement device for estimating thermal characteristics is put on 4 cones having triangular pyramid, the thermal characteristics is accurately and adequately measured because of a design in which the transfer of the heat from the body to the outside is minimum.

In the measurement device for estimating thermal characteristics, to shorten turnaround time for measurement and to use a system for displaying or diagrammatizing the measurement data are important function for the heat measurement by using the unidirectional heat flow steady state comparison method. Therefore, when it connects to analysis software (ex. Microsoft Excel: registered trademark of Microsoft) for computer and the data is sequentially transformed to useful information to be shown, the thermal characteristics can be accurately and adequately acknowledged visually.

According to the method for estimating thermal characteristics using the measurement device for estimating thermal characteristics of the present invention, the thermal characteristics can be accurately and simply measured.

And according to the heat radiation method of the present invention, the heat can be effectively radiated sufficiently by using the three-layer structure comprising the object to be measured for estimating the thermal characteristics which has been adequately estimated under the measurement method for estimating thermal characteristics from an electric material, an electronic material, a printed-wiring assembly for a semiconductor component, a motor, a lighting equipment, an automobile equipment, and a radiating material, all which are sandwiched between a heat generating source material and a heat cooling source material.

And the reducing agent for the value of interfacial contact thermal resistance of the present invention enables to measure the thermal characteristics by using the measurement device for estimating thermal characteristics or the measurement method for estimating thermal characteristics, or to improve the efficiency of the heat radiation by using the heat radiation method.

When the reducing agent for a value of interfacial contact thermal resistance is used for the reducing method for a value of thermal resistance of the present invention, the thermal resistance between the joining material and the joined material is reduced and/or the thermal noise is reduced or canceled. Thereby, the value of thermal resistance can be reduced or canceled.

MODE FOR CARRYING OUT THE INVENTION

Hereunder, the embodiments for carrying out the present invention are explained according to figures.

First of all, outline of the overall features is explained.

(Overall Features)

Figure 1:
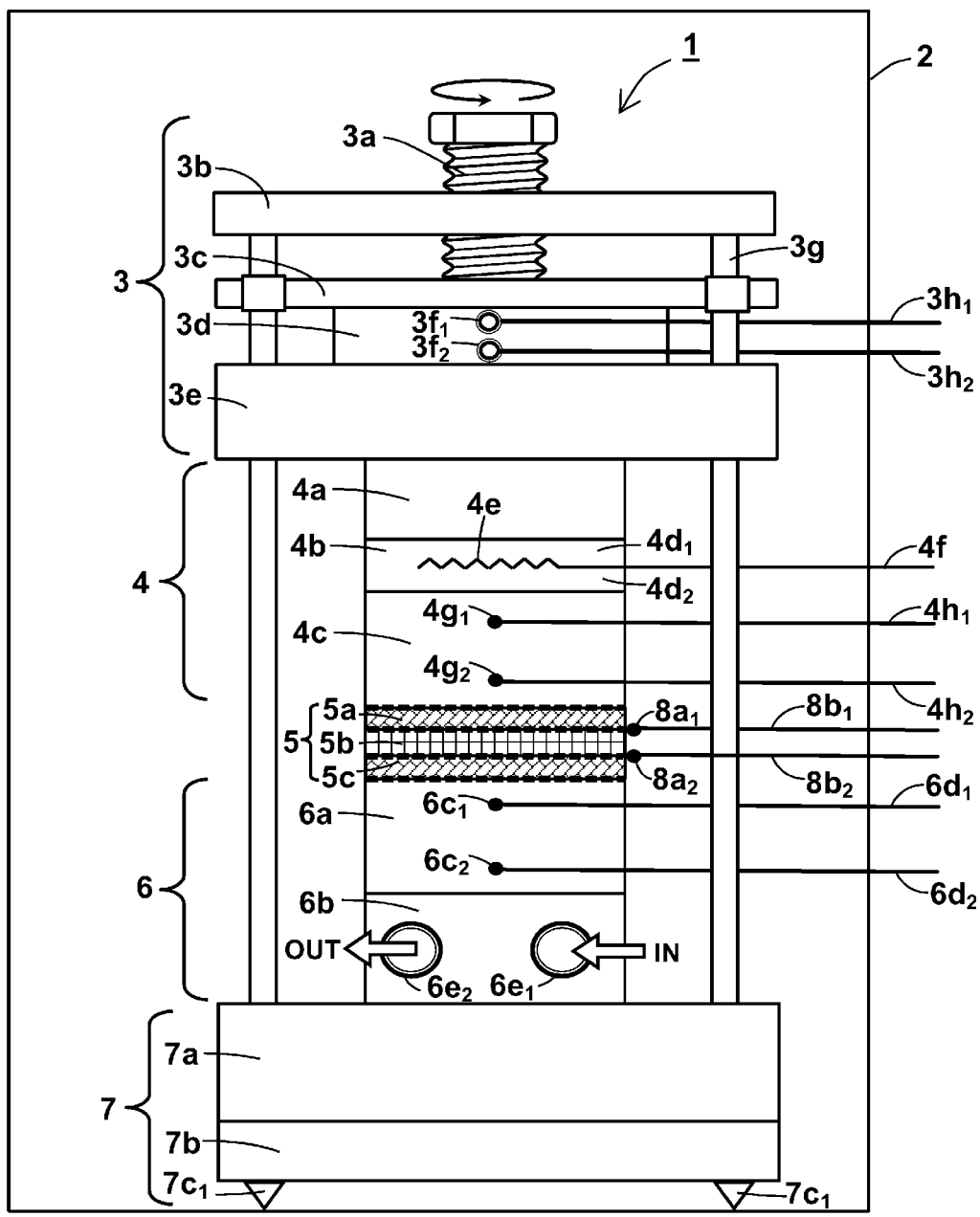
FIG. 1 is a schematic front view that shows an outline of the measurement device for estimating thermal characteristics of the present invention.

FIG. 1 shows a schematic front view that shows the features of a body of a measurement device 1 for estimating thermal characteristics. As shown in FIG. 1, the body of the measurement device 1 for estimating thermal characteristics is set in a transparent plastic case 2 etc. having a window where a measurement sample (a three-layer structure) of a measurement sample unit 5 can be took in and out. The measurement device 1 for estimating thermal characteristics is provided with a measurement function by using a unidirectional heat flow steady state comparison method, and composes a load unit 3, a heat generating source unit 4, a measurement sample unit 5, a heat cooling source unit 6, and a support unit 7. The measurement sample unit 5 is arranged at a midmost so that the heat generating source unit 4 which enables to measure a heat quantity is connected to the load unit 3 which enables to measure a deformation upward, and the heat cooling source unit 6 which enables to measure a heat quantity is connected to the support unit 7 downward. The body of the measurement device 1 for estimating thermal characteristics is connected to a data-indicating system 11 which shows results of the thermal characteristics.

Figure 2:
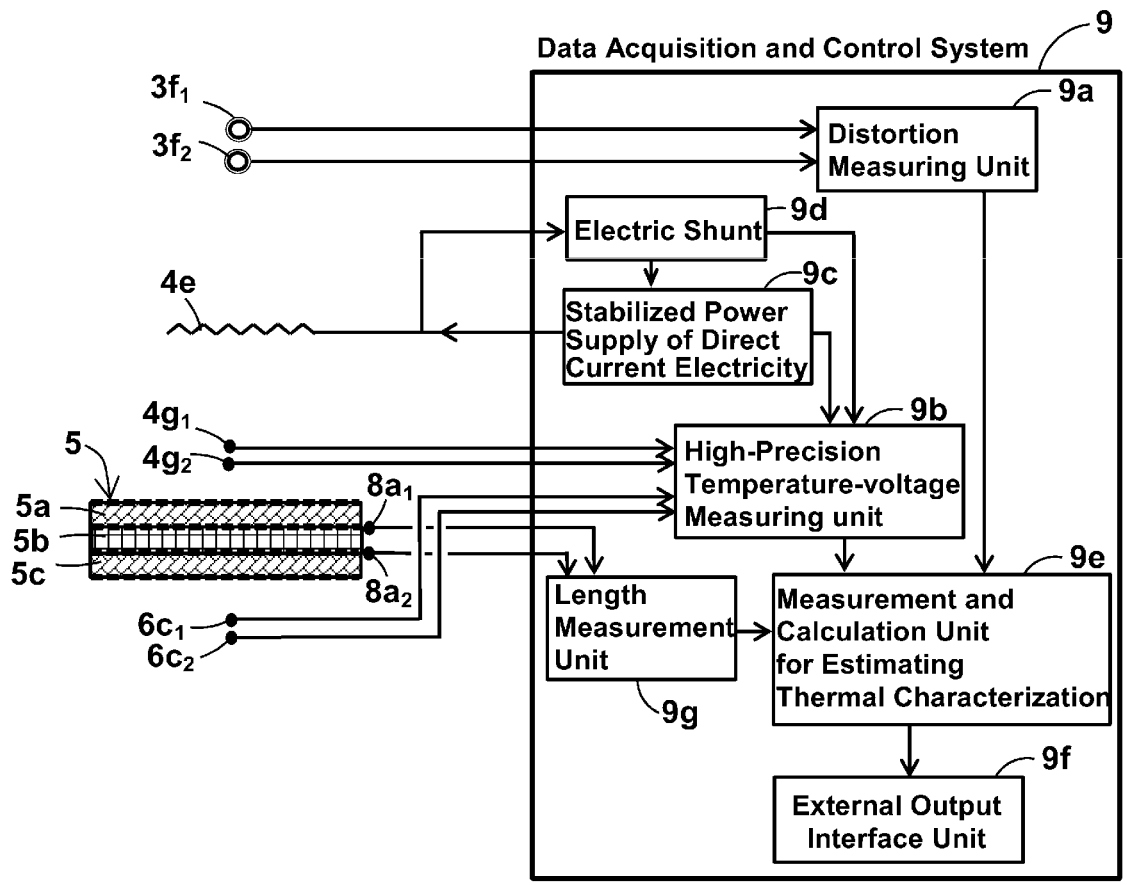
FIG. 2 is a block diagram that shows a system for a data acquisition and control system connected to the body of the measurement device for estimating thermal characteristics of the present invention.
Figure 3:
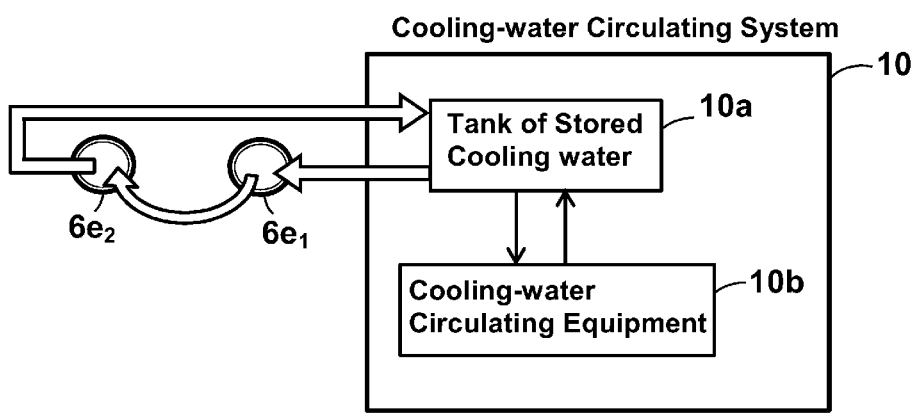
FIG. 3 is a block diagram that shows a cooling-water circulating system connected to the body of the measurement device for estimating thermal characteristics of the present invention.

Next, individual features of the load unit 3 which is connected to a data acquisition and control system (see FIG. 2), the heat generating source unit 4, the measurement sample unit 5 (see FIGS. 5-6), the heat cooling source unit 6 which is connected to cooling-water circulating system (see FIG. 3), the support unit 7, and a data-indicating system 11 (see FIG. 4) in the body of the measurement device 1 for estimating thermal characteristics having functions for estimating thermal characteristics, are explained in detail according to FIG. 1. Also accessories thereof (see FIG. 7), and a measurement method for estimating thermal characteristics are explained in detail.

(Feature of the Load Unit)

The load unit 3 has a load screw rod 3a which loads pressure to the measurement sample unit 5, a SUS screw-cut plate 3b which screws the load screw rod 3a and constringes it by overspin, a guide 3g which makes the SUS screw-cut plate 3b move up and down without rotation during the overspin for constringing or back spin for easing, a load cell 3d which detects a load applied onto the measurement sample unit 5 by the load screw rod 3a, and a heat insulation plate 3e as a heat insulation block which connects to the load cell 3d and prevents heat radiation from the heat generating source unit 4. Although it is preferable to use reducing gears so as to apply the regular load in this case, thus contraption is not restricted. Distortion gauges $3f_1$ and $3f_2$, which detects the applied load by the load cell 3d as a strain voltage, are connected to a distortion measuring unit 9a (see FIG. 2) of a data acquisition and control system 9 which detects distortion data thereof and outputs and records the data via wirings $3h_1$ and $3h_2$ for the distortion gauge measurement.

(Feature of the Heat Generating Source Unit)

The heat generating source unit 4 comprises a heat insulation plate 4a as a heat insulation block for addressing unidirectionally a heat flow from the heat generating source 4b, plural pieces of a heat generating source plate consisting of polyimide/stainless steel wire/polyimide (PI/SUS/PI) as insulating resin of polyimide films $4d_1$ and $4d_2$ and an electrothermal heater 4e for a heat generating source unit 4b, a wire 4f which supplies a stable direct current electricity and connects from a stabilized power supply 9c (see FIG. 2) of direct current electricity to the heat generating plate, a voltage measuring device and a recording device (not shown) to which the direct current electricity connects from the heat generating plate via the wire 4f to an electric shunt 9d (see FIG. 2), an upper-side heat-collection metallic block 4c made of Al which collects the heat conducted from the heat generating plate, and thermocouples $4g_1$ and $4g_2$ as two heat sensors connecting to the upper-side heat-collection metallic block 4c. The thermocouples $4g_1$ and $4g_2$ connect via wires $4h_1$ and $4h_2$ for a high-precision temperature-voltage measuring unit to the high-precision temperature-voltage measuring unit 9b of a data acquisition and control system 9 which measures and controls the temperature (see FIG. 2).

(Feature of the Measurement Sample Unit)

The measurement sample unit 5 comprises one of the three-layer structure as a metallic plate/a sample to be measured/a metallic plate that consists of an object 5b to be measured for estimating thermal characteristics (the sample to be measured) and heat conducting materials (metallic plates) 5a and 5c which sandwich it. The three-layer structure has layers $5a_1$ and $5c_1$ (see FIG. 5) of a heat-transfer promoting agent as a portion that is coated by the heat-transfer promoting agent which is physically contacted to an outside surface of the metallic plate on the heat conducting materials 5a and 5c. The heat conducting material 5a is adhered tightly to the heat generating source unit 4 via the layer $5a_1$ of the heat-transfer promoting agent, and the heat conducting material 5c is adhered tightly to the heat cooling source unit 6 via the layer $5c_1$ of the heat-transfer promoting agent. The heat conducting materials 5a and 5c that is coated by the layers $5a_1$ and $5c_1$ of the heat-transfer promoting agent on the outside surfaces thereof, and the object 5b to be measured for estimating thermal characteristics that is sandwiched between the inside surfaces of the heat conducting materials 5a and 5c and is able to be multimodally replaced, are tightly adhered to be bonded by physical contact, chemical contact through the heat-transfer promoting agent, and/or chemical bond contact through a molecular adhesive agent.

Figure 5:
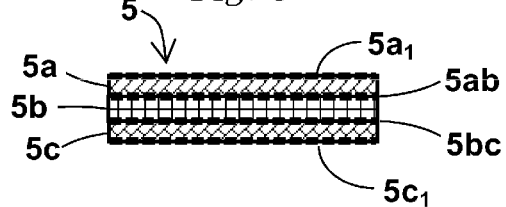
FIG. 5 is a schematic general view that shows the heat conducting material made of metal/the object to be measured/the heat conducting material made of metal and their interface layers and surface layers that construct the three-layer structure as the measurement sample unit of the measurement device for estimating thermal characteristics of the present invention.

As shown in FIG. 5, various interfaces such as the physical contact (mechanical contact or intermolecular force contact) or the chemical contact (chemical bond contact) are formed between the heat conducting material 5a of the metallic plate coated with the heat-transfer promoting agent on the outside surface (upper side), the object 5b to be measured for estimating thermal characteristics as the sample to be measured which is able to be multimodally replaced, and the heat conducting material 5c of the metallic plate coated with the heat-transfer promoting agent on the outside surface (down side) respectively. Thereby, it is ensure to investigate relationship between state of the interface and the heat-transfer, as well as to estimate or search the thermal characteristics of heat-transfer parts of practical equipment and experimental equipment or inspectional equipment. Among them, the three-layer structure may be used for controlling thereof so that the heat conducting materials 5a and 5c and the object 5b to be measured for estimating thermal characteristics are tightly adhered to be bonded by the physical contact. Or the three-layer structure may be used for measuring the estimation of real thermal characteristics so as to be tightly adhered to be bonded by the chemical contact through the heat-transfer promoting agent and/or the chemical bond contact through the molecular adhesive agent.

Figure 6:
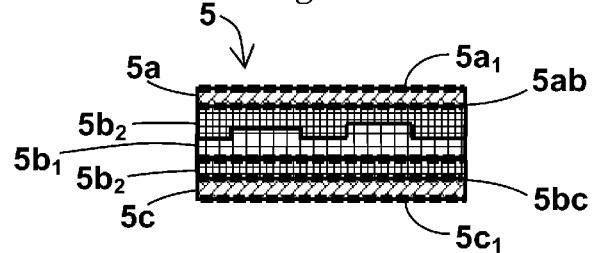
FIG. 6 is a schematic general view that shows the heat conducting material made of metal/the silicone rubber/the heterologous and heteromorphous object to be measured/the silicone rubber/the heat conducting material made of metal that construct the heterologous and heteromorphous three-layer structure as the measurement sample unit of the measurement device for estimating thermal characteristics of the present invention.

The object 5b to be measured for estimating thermal characteristics not only can be appropriately selected as the sample to be measured whose thickness may be varied at any time, but also can be voluntarily selected as the sample to be measured having complex shapes and may be a three-layer structure having the complex shapes (see FIG. 6).

Figure 7:
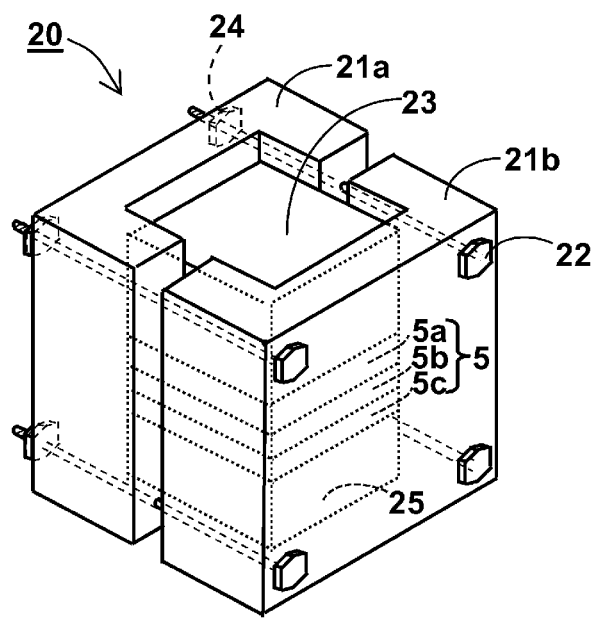
FIG. 7 is a perspective view that shows half-way where the three-layer structure of the measurement sample unit as the heat conducting material made of metal/the silicone rubber/the heat conducting material made of metal of the measurement device for estimating thermal characteristics of the present invention is prepared by using the jig for building.

The measurement sample unit 5 consisting of the three-layer structure as shown in FIG. 5, is prepared by using a jig 20 for building as shown in FIG. 7. First of all, a downside spacer 25 is put in a cavity portion sandwiched with right and left exterior frames 21a and 21b which are faced each other in the jig 20 for building. The heat conducting material 5c of a metallic plate (ex. 1*22*22 mm cubic) is put thereon, and then un-crosslinking or crosslinking object 5b to be measured (ex. a*22*22 mm cubic; a is arbitrary thickness for example 0.0001 mm to 20 mm, preferably 0.001 to 10 mm; they may differ according to a kind of the object to be measured) is put on. After that, the heat conducting material 5a of a metallic plate (ex. 1*22*22 mm cubic) is put, and further an upper-side spacer 23 is put on. Next, they are conducted pressure-bonding by pressure of 0.01-1 MPa or crosslink pressure-bonding at 50-180° C. for 1 minute-30 minutes. The right and left exterior frames 21a and 21b having a U shape are employed so as to take the three-layer structure out easily during work. And tops and bottoms thereof are clamped by screws of bolts 22 and nuts 24 to suppress changes of sizes of the jig 20 during pressure-bonding. The bonding between the heat conducting material 5a, the object 5b to be measured for estimating thermal characteristics and the heat conducting material 5c is conducted by the physical contact, the chemical contact through the heat-transfer promoting agent or the chemical bond contact through the molecular adhesive agent respectively.

A length measuring device 8 (see FIG. 1) is provided on side faces of the metallic blocks 4c and 6a holding the object 5b to be measured for estimating thermal characteristics in the measurement device for estimating thermal characteristics so as to measure the thickness of the object 5b to be measured for estimating thermal characteristics accurately.

The length measuring device 8 is used for correcting thickness of the sample, by measuring the thickness of the sample to be measured thereby after applying the load pressure on the surface to the object 5b to be measured for estimating thermal characteristics and then coming up to the steady state of temperature difference between both of the metallic blocks.

The length measuring device 8 consist of an upper-side gauge head $8a_1$ of the length measuring device and a down-side gauge head $8a_2$ of the length measuring device. The gauge heads $8a_1$ and $8a_2$ of the length measuring device are respectively connected via wires $8b_1$ and $8b_2$ for a length measuring unit to a length measurement unit 9g in a data acquisition and control system 9 (see FIG. 2) which measures thickness of the object 5b to be measured for estimating thermal characteristics and controls to memorize it. For the length measuring device 8, well-known length measuring devices are used. For example, an electronic comparator that indicates mechanical displacements of the gauge head $8a_1$ and $8a_2$ as a swing of an indicator needle which is conveniently converted to an electric quantity by a conversion method such as an induction type, a resistance type or a capacity type, a laser interferometry length measuring device, and a digital micrometer are exemplified. They enable to detect the thickness of micro meter order of the object 5b to be measured for estimating thermal characteristics. Example of the length measuring device 8 is pencil-type short range sensor head GT2-S1 (which is available from Keyence Corporation and is a trade name).

(Feature of the Heat Cooling Source Unit)

The heat cooling source unit 6 comprises a down-side heat-collection metallic block 6a made of Al which contacts to the measurement sample unit 5, and thermocouples $6c_1$ and $6c_2$ as two thermosensors which connect to the down-side heat-collection metallic block 6a. The thermocouples $6c_1$ and $6c_2$ connect via wires $6d_1$ and $6d_2$ for a high-precision temperature-voltage measuring unit to the high-precision temperature-voltage measuring unit 9b in a data acquisition and control system 9 (see FIG. 2) which measures and controls the temperature. In the heat cooling source unit 6, a thermal exchange cooling device 6b, which is thermally connected to the down-side heat-collection metallic block 6a, connects to a cooling-water circulating system 10 (see FIG. 3). The thermal exchange cooling device 6b comprises a tank 10a of stored cooling water for circulation which pumps the cool water into a hose connected to an inflow hole $6e_1$ of the cooling water in the thermal exchange cooling device 6b, a pipe which cools the thermal exchange cooling device 6b on a way from the inflow hole $6e_1$ of the cooling water to the outflow hole $6e_2$ of the cooling water, and a hose in which the warmed cooling water by the thermal exchange pumps from the outflow hole $6e_2$ of the cooling water and get it back to the 10a of stored cooling water for circulation. Although the above-mentioned heat cooling source unit is a basic cooling equipment, Peltier elements, which have Al fins and a motor, may be used.

(Feature of the Support Unit)

In the support unit 7, a heat insulation material 7a and a stillage 7b, which mounts the load unit 3, the heat generating source unit 4, the measurement sample unit 5 and the heat cooling source unit 6, are supported by pedestals $7c_1$ and $7c_2$ having a cone shape so as to be hard to be affected by external environment.

(Features of the Data Acquisition and Control System and the Data-Indicating System)

In the data acquisition and control system 9, a pair of thermocouples $4g_1$ and $4g_2$ connected to the upper-side heat-collection metallic block 4c of the heat generating source unit 4 and a pair of thermocouples $6c_1$ and $6c_2$ connected to the down-side heat-collection metallic block 6a of the heat cooling source unit 6, both which are used for detecting heat-transfer to the measurement sample unit 5 of the three-layer structure, are connected to the high-precision temperature-voltage measuring unit 9b for measuring and controlling the respective temperature. And a stabilized power supply of direct current electricity 9c and an electric shunt 9d, which are connected to the heat generating source 4b of the heat generating source unit 4, are connected to the high-precision temperature-voltage measuring unit 9b. Additionally, the distortion gauges $3f_1$ and $3f_2$ of a load cell 3d are connected to a distortion measuring unit 9a. The gauge heads $8a_1$ and $8a_2$ of the length measuring device are connected to the length measurement unit 9g in order to accurately measure the thickness of the object 5b to be measured for estimating thermal characteristics. The high-precision temperature-voltage measuring unit 9b, the distortion measuring unit 9a and the length measurement unit 9g are connected to a measurement and calculation unit 9e for estimating thermal characteristics. The measurement and calculation unit 9e for estimating thermal characteristics is connected to an external output interface unit 9f. Those are controlled by a central processing unit (CPU) of a computer which information-processes an electrical signal from a body of the measurement device 1 for estimating thermal characteristics via the data acquisition and control system.

Figure 4:
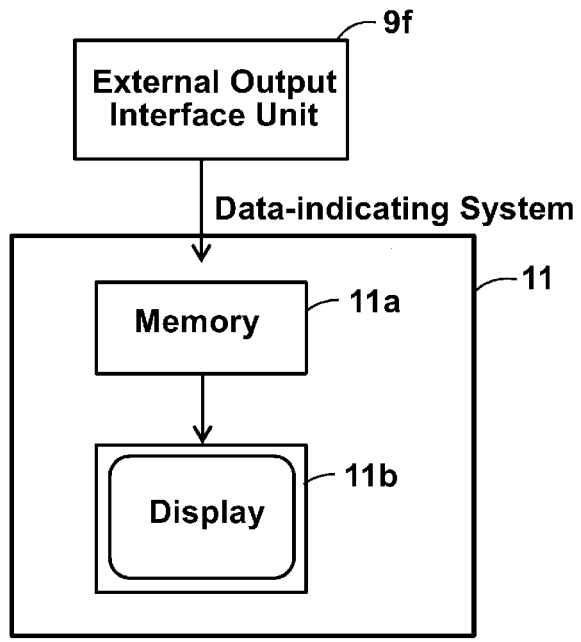
FIG. 4 is a block diagram that shows a data-indicating system connected to the body of the measurement device for estimating thermal characteristics of the present invention.

As shown in FIG. 4, the external output interface unit 9f is connected to a display 11b indicating the results of the estimated thermal characteristics as data. The data stored in memories 11a are various data such as the distortion by the distortion gauges $3f_1$ and $3f_2$, the temperature by the thermocouples $4g_1$ and $4g_2$ or $6c_1$ and $6c_2$, the thickness of the object 5b to be measured for estimating thermal characteristics by the gauge heads $8a_1$ and $8a_2$, and electricity of the heat generating source 4b by the electric shunt 9d, or the results of the estimated thermal characteristics based on them.

(Features Between of Respective Component Materials and Parts)

As regards features between respective component materials and parts in the measurement device for estimating thermal characteristics, binding surfaces between different materials except for attachment of the measurement sample unit between the metallic blocks put into a bonding state which is mixed with the chemical bonds and the molecular forces by a molecular binding technology with using a molecular adhesive agent. Binding methods are employed so as to take into account of transmittance of stress or heat quantity.

(Load to the Object to be Measured)

As regards arrangement of the functional parts of the measurement device 1 for estimating thermal characteristics, the load unit 3 is stayed away from the object 5b to be measured for estimating thermal characteristics. There is a problem whether the measured pressure differs from a pressure at a portion of the sample to be measured or not. However, when both pressures are compared, there is little difference between both pressures below 0.4 MPa of pressure. There is difference within ±2% at approximately 1 MPa, while there is little difference between the measured thermal resistances. Therefore it is thought that there are few problems, because the commonsensical loaded pressure applied during the usage thereof is 1 MPa or less.

(Bonding of the Heat Generating Source Unit)

The heat generating source unit 4 of the measurement device 1 for estimating thermal characteristics is prepared as follows, in order to accurately measure the change of the temperature of the measurement sample unit 5 as the three-layer structure. The respective interfaces between the heat insulation plate 4a as the heat insulation material and the upper-side polyimide film $4d_1$ as insulation resin of the heat generating source 4b, between the upper-side polyimide film $4d_1$ and the circuit wiring 4e made of stemless as the electrothermal heater, between the circuit wiring 4e made of stemless and the down-side polyimide film $4d_2$, and between the down-side polyimide film $4d_2$ and the upper-side heat-collection metallic block 4c, are prepared through the molecular adhesive agent technique for bonding of non-fluent materials by soaking them into an aqueous solution (0.01 wt. %) of the molecular adhesive agent and then drying them, and contacting and heating them (at 120° C. for 10 min.) without using adhesive.

(The Three-Layer Structure of the Measurement Sample Unit)

When using the measurement device 1 for estimating thermal characteristics, there are interface layers of two portions (the heat conducting materials 5a and 5c as the metallic plates) of the contact interfaces 5ab and 5bc of the object to be measured. They are located between the down-side surface of the upper-side heat-collection metallic block 4c in the heat generating source unit 4 or the upper-side surface of the down-side heat-collection metallic block 6a of the heat cooling source unit 6 and the three-layer structure. Specifically low-volatile, pressure-independent and gap-length-independent heat spaces with extremely low value of thermal resistance are provided in any contact gap between metal/metal among the metallic plates, for example, Al/Al, Cu/Al, Al/Cu or Cu/Cu or alloy combination thereof. In the case, it is important that the value of thermal resistance of the contact gap layer between the materials is always kept as a constant value of contact thermal resistance in spite of the measurement conditions.

As shown in FIG. 5, in the three-layer structure in the measurement sample unit 5 of the measurement device 1 for estimating thermal characteristics, the heat conducting materials 5a and 5c as two pieces of metallic plates may be general metallic plates such as SUS (thermal conductivity; 16.2 W/Km), Al (thermal conductivity; 240 W/Km) or Al alloy (thermal conductivity; 139 W/Km), or copper (thermal conductivity; 391 W/Km) or copper alloy (thermal conductivity; 320 W/Km). A heat-transfer promoting agent is coated onto the upper-side surface of the heat conducting material 5a (the metallic plate) and the down-side surface of the heat conducting material 5c (the metallic plate). Thereby, the value of thermal resistance of the contact between the metal is kept as a constant value of low level. And low dependent state of pressure, temperature, time, and surface-roughness is conditioned. The values of both of the upper-side or down-side surface are approximately fallen within $\pm 0.007*10^{-3}$ $m^2$ K/W. The values are lower than the value of contact thermal resistance as low-level, and are appropriate.

(The Steady State in Measuring Thermal Resistance by the Measurement Device for Estimating Thermal Characteristics)

Figure 8:
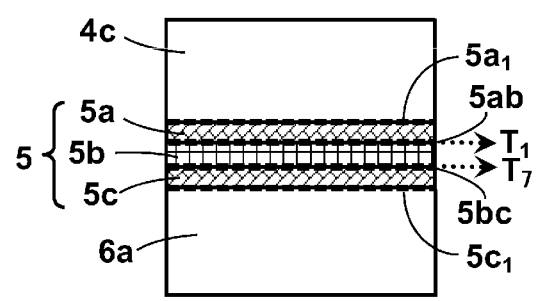
FIG. 8 is a schematic general view that shows a state where the heat conducting material made of metal/the object to be measured/the heat conducting material made of metal and the heat insulation plates, which construct the three-layer structure as the measurement sample unit of the measurement device for estimating thermal characteristics of the present invention, are stacked
Figure 10:
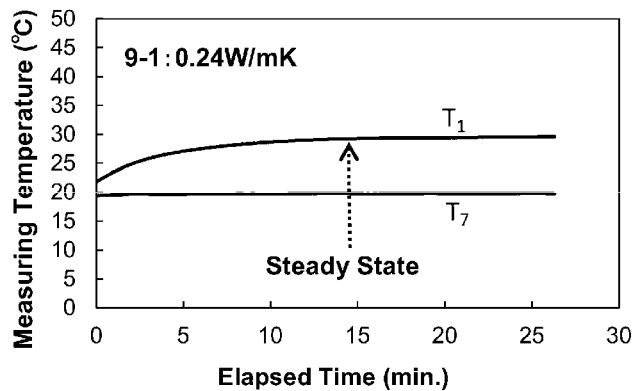
FIG. 10 is a graph that indicates changes of measured temperature of the three-layer structure as the measurement sample unit and time until a plateau steady state, when the measurement device for estimating thermal characteristics which applies the present invention and a measurement device for estimating thermal characteristics which does not apply the present invention are used.
Figure 10:
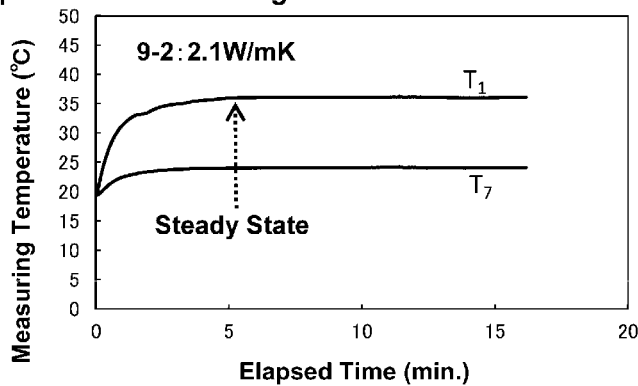
Figure 10:
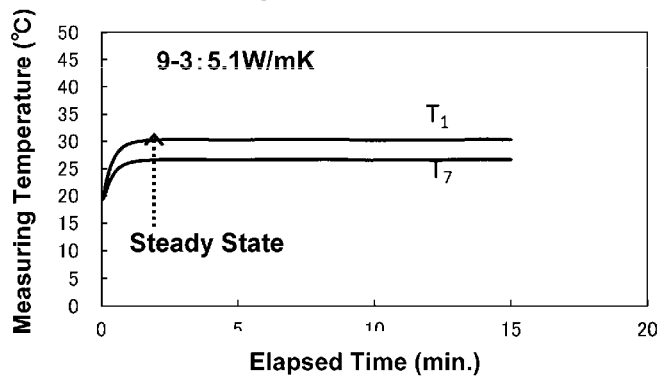

An expeditious measurement is desired in the measurement of the thermal resistance. Therefore, an expeditious property was investigated by temporally measuring temperatures ($T_1$ and $T_7$) on the surfaces of both metallic blocks of the upper-side heat-collection metallic block 4c and the down-side heat-collection metallic block 6a as shown in FIG. 8. Results thereof are shown in FIG. 10. When the temperatures attaining in the steady state of the article having 0.24 W/mk, the article having 2.1 W/mk, and the article having 5.1 W/mk were measured, excellent results were obtained as shown in FIG. 10. A computer software (ex. available from Daichi Inc.) in which a slope from start-up of the temperature is differentiated with respect to the values of measurement to calculate a steady value, is integrated in the measurement device 1 for estimating thermal characteristics since the steady state is calculated to be estimated and is recorded at much earlier stage before the steady state, which is a short stage of about 0.5-1 min of the attaining time for the steady state in particular. Therefore it is found to be a fast-measurement device.

Hereunder, the total value of thermal resistance of the three-layer structure as shown in FIG. 8 is illustrated;

R=the value of thermal resistance between (1)-(7)=$R_{(1)}+R_{(2)}+R_{(3)}+R_{(4)}+R_{(5)}+R_{(6)}+R_{(7)}$ And values of thermal resistance of components as the contact interface, the metal and the object to be measured are respectively illustrated as below;

the value of contact thermal resistance between Al/Al= $R_{(1)}+R_{(7)}$=0.015 ($10^{-3}$ $m^2$ K/W)

the value of contact thermal resistance between Al/the object to be measured=$R_{(3)}+R_{(5)}$=Rc ($10^{-3}$ $m^2$ K/W)

the value of thermal resistance of Al=$R_{(3)}+R_{(6)}$=0.00417 ($10^{-3}$ $m^2$ K/W)

the value of thermal resistance of the object to be measured=$R_{(4)}$=Rs the total value of thermal resistance: Rt=R+Rc−0.015−2*0.00417 $\Delta T=T_1-T_7$.

(The Composition of the Heat-Transfer Promoting Agent)

The thermal spaces, which are generated between the upper-side surface and the down-side surface of the heat conducting materials (the metallic plates) 5a and 5c of the three-layer structure as the measurement sample unit 5 in the measurement device 1 for estimating thermal characteristics, are filled up with a vehicle of the heat-transfer promoting agent. Thereby, the value of contact thermal resistance in the thermal spaces may be an extremely low value of thermal resistance, and low-volatile, pressure-independent and gap-length-independent.

The heat-transfer promoting agent is coated onto the upper-side surface and down-side surface of two metallic plates such as Al plates on the top and bottom of the three-layer structure of the measurement sample unit 5 in the measurement device 1 for estimating thermal characteristics. The components of the heat-transfer promoting agent comprise high purity water selected from heavy water, distilled water and ion-exchanged water; a surface active agent selected from a cationic surfactant, a nonionic surfactant, an anionic surfactant, an ampholytic surfactant; carboxy methyl cellulose, polyethylene glycol, and polyvinyl alcohol; a builder selected from sodium sulfate, sodium sulfite, sodium carbonate, ammonium sulfite, ammonium carbonate, sodium phosphate, sodium silicate, ammonium silicate, ammonium phosphate, sodium phosphite, ammonium phosphite, sodium nitrate, sodium nitrite, ethylenediaminetetraacetic acid, ethylenediamine, and ammonium ethylenediaminetetraacetate; and/or a metallic surface stabilizer selected from triazine trithiol metallic salt, benzotriazole hydrochloride, EDTA (ethylenediaminetetraacetic acid), EDTA-lactic acid salt, resorcin, t-butylphenol, and aminophenyl aniline. In the case, the thermal spaces may have the extremely low value of thermal resistance, and become low-volatile, pressure-independent and gap-length-independent.

The cationic surfactant for the present invention means trimethyl single-chained=higher-saturated-alkyl ammonium halogenide, trimethyl single-chained=higher-unsaturated-alkyl ammonium halogenide, dimethyl double-chained=higher-saturated-alkyl ammonium halogenide, trimethyl single-chained=higher-saturated-alkyl ammonium halogenide, trimethyl single-chained=higher-unsaturated-alkyl ammonium hydroxide, dimethyl double-chained=higher-saturated-alkyl ammonium hydroxide, dimethyl double-chained=higher-unsaturated-alkyl ammonium halogenide, methyl triple-chained=higher-saturated-alkyl ammonium halogenide, methyl triple-chained=higher-unsaturated-alkyl ammonium halogenide, quadruple-chained tetramethyl ammonium chloride, quadruple-chained tetraethyl ammonium chloride, quadruple-chained tetrapropyl ammonium chloride, quadruple-chained tetrabutyl ammonium chloride, triphenyl single-chained=higher-alkyl phosphonium halogenide, triphenyl single-chained=higher-alkyl phosphonium hydroxide, alkyl benzyl dimethyl ammonium salt, phosphatidyl inositol (PI), phosphatidyl serine (PS), phosphatidyl ethanol amine, tetrabutyl phosphonium bromide, tetraoctyl phosphonium bromide, tetrabutyl ammonium bromide, tetraoctyl ammonium bromide, and so on.

The anionic surfactant is exemplified with steareth-6, sodium laureth sulfate, alkyl ether sulfate ester sodium salt, alkyl sulfonic acid sodium salt, linear-alkyl benzene sulfonic acid salt, alkyl ether sulfate sodium ester, alkyl ether sulfate sodium ester, reactant of tris(2-aminoethylamino) amine and organic acid, reactant of tris(2-aminoethylamino) amine and organic acid anhydride, 6-octylamino-1,3,5-triazine-4-thiol-2-thiosodium salt, 6-octylamino-1,3,5-triazine-4-thiol-2-thiopotassium salt, 6-triethoxysilyl propylamino-1,3,5-triazine-2-thiol-2-thiopotassium salt, 6-triethoxysilyl propylamino-1,3,5-triazine-2,4-diamino ethyl amine, 6-triethoxysilyl propylamino-1,3,5-triazine-2,4-diamino ethyl amine, 6-triethoxysilyl propylamino-1,3,5-triazine-2,4-diamino ethyl amine, 6-triethoxysilyl propylamino-1,3,5-triazine-2,4-dihydrazine, 6-di(trihydroxysilyl propyl)amino-1,3,5-triazine-2,4-diaminoethyl amine, 6-trihydroxysilyl propyl amino-1,3,5-triazine-2,4-diaminoethyl amine, saturated-alkyl benzene sulfonic acid salt, dialkyl sodium sulfosuccinate, saturated alkyl, monoalkyl acid salt, alkyl polyoxyethylene sulfonic acid salt, cocoyl glutamic acid TEA, cocamidemethyl MEA, cocamide MEA, ammonium laureth sulfate and so on.

As ampholytic surfactant, alkyl amine oxide, fatty acid alkanolamide, alkyl amido propyl betaine, palm kernel fatty acid amido propyl betaine, alkyl amine oxide, alkyl amine oxide, alkyl betaine, lauryl hydroxy sultaine, laureth-16, lauramido propyl betaine, alkyl hydroxy sulfobetaine, alkyl amine oxide, alkyl glycoside, alkyl hydroxyl sulfobetaine, alkyl dimethyl amine oxide $R(CH_3)_2NO$, alkyl carboxy betaine $R(CH_3)_2N^+CH_2COO^-$, 2-trihydroxysilyl propyl amino-3,5-diaminoethylamino-1,3,5-triazine, 2-(di-trihydroxysilyl propyl amino)-3,5-diaminoethylamino-1,3,5-triazine, 2-(di-trihydroxysilyl propyl)amino-4,6-diaminoethylamino-1,3,5-triazine, 2-(trihydroxysilyl propyl)amino-4,6-diaminoethylamino-1,3,5-triazine, 2-di(trihydroxysilyl propyl amino)-4,6-aminoethyl(diaminoethyl)amino-1,3,5-triazine, and 2-(di-trihydroxysilyl propyl) amino-4,6-di(diethylene triamino)amino-1,3,5-triazine etc. are effective.

The nonionic surfactant falls into compounds such as distearic acid glycol, polyoxyethylene alkyl ether, polyoxyethylene alkyl ether $RO(CH_2CH_2O)_mH$ (R is for example an alkyl group having 1-30 carbons, m is a number of additional mole of ethylene oxide for example 2-1000), fatty acid sorbitan ester, alkyl polyglycoside, fatty acid diethanol amide $RCON(CH_2CH_2OH)_2$ (R is as same as above), alkyl monoglyceryl ether $ROCH_2CH(OH)CH_2OH$ (R is as same as above), coconut oil fatty acid PEG-7 glyceryl ester, polyoxyethylene alkyl ether and so on.

The heat-transfer promoting agent may include other additives such as citric acid, EDTA tetrasodium salt, ethylene diamine disuccinic acid trisodium salt, panthenol, panthenyl ethyl HCl salt, methyl chloroisothiazolinone, sodium citrate, sodium xylenesulfonate, polyquaternium-10, tocopherol acetate, PPG-7, citric acid, lactic acid, potassium sorbate, glycerin, sodium hydroxide, sodium sulfite, EDTA, sodium benzoate, fragrance rice bran extract, rice extract, peony extract, lachancea, hydrolyzed rice ferment liquid, rice germ oil, cherry leaf extract, camellia seed extract, *belamcanda chinensis* extract, *sapindus mukurossi* extract, sodium chloride, citric acid, guar hydroxy propyl trimonium chloride, polyquaternium-10, polyquaternium-7, BG, ethanol, EDTA disodium salt, fragrance, caramel lemon fruit extract, kiwi extract, raspberry extract, glycyrrhizinic acid dipotassium salt, polyquaternium-10, cocamide MEA, laureth-3, sodium chloride, phosphoric acid, potassium hydroxide, benzyl alcohol, a stabilizing agent, metal sequestrant, disinfectant.

Examples of the composition of the heat-transfer promoting agent or the dispersion fluent are ingredients of water of 49.7-99.88 wt. %, preferably 50-99.88 wt. %, more preferably 70-99.88 wt. %; the surface active agent of 0.1-50 wt. %, preferably 0.1-30 wt. %; the builder of 0.1-10 wt. %; and the metallic surface stabilizer of 0.1-5 wt. %. The indispensable principal ingredients are water and the surface active agent, and others take a subservient role. The surface active agent reduces viscosity of water, and coinstantaneously prevents surface vaporization. The builder increases an inhibitive effect on water vaporization by the surface active agent, and enhances contact to the metal surface and suppresses aggregation of bubbles.

The foregoing indicates the examples, in which the heat conducting materials 5a and 5c as two metallic plates of the upper-side surface and down-side surface of the three-layer structure of the measurement sample unit 5 and the object 5b to be measured for estimating thermal characteristics in the measurement device 1 for estimating thermal characteristics, are tightly adhered through the chemical contact through the heat-transfer promoting agent. However, they may be tightly adhered through the chemical bond contact through the molecular adhesive agent. It is preferable that the bonding surfaces between the different materials such as the heat insulation plate 4a and the heat generating source 4b, the insulating resin $4d_1$ and $4d_2$ in the heat generating source 4b and the electrothermal heater 4e, the heat generating source 4b and the upper-side heat-collection metallic block 4c, and/or the down-side heat-collection metallic block 6a and the heat cooling source unit 6 except the bonding of the measurement sample unit in the measurement device 1 for estimating thermal characteristics, are tightly adhered to be bonded by the molecular bonding technology using the molecular adhesive agent through bonding figuration which mixes the chemical bond by more stronger covalent bonding than mere physical contact or chemical contact and the intermolecular force. Single molecule or plural molecules of the molecular adhesive agent molecules makes them bond chemically at both bonding sites thereof at once. They can be strongly bonded by the chemical bonding at many bonding sites each other.

(Molecular Bonding Technology)

According to the molecular bonding technology, various members of the same or different kind materials such as metal-metal, resin-resin or metal-resin, can be bonded through the chemical bonding by using the molecular adhesive agent. The molecular adhesive agent is reacted to the bonding sites such as active functions of hydroxyl groups which originally exist on the surface of the materials to be adhered, or the bonding sites such as amplified active functions which is prospectively generated on the surface of the materials to be adhered through reformulation by using acid or base etc. or by using heat, light, electricity or electromagnetic wave etc. Thereby, the molecular adhesive agent can adhere with them by the chemical bonding. Therefore, much stronger binding strength by the molecular adhesive agent is shown than one of binding by molecular force after curing a resin such as an agglutinant.

Examples of the molecular adhesive agent are silane derivatives or triazine thiol derivatives having a silyl group and/or an amino group and a mercapto group which may have a substituent. The substituent is selected from the group consisting of an alkyl group, an alkoxy group, an ether group, a carbonyl group, a carboxyl group, a mercapto group an amino group, and a thioether group. The molecular adhesive agent is exemplified with the triazine thiol derivatives such as triethoxysilyl propyl triazine dithiol, tritrimethoxysilane propyl mercaptan, 6-trimethoxysilane decyl amino-1,3,5-triazine-2,4-dithiol, 6-dimethyl methoxysilane propyl amino-1,3,5-triazine-2,4-dithiol, 6-di(triethoxysilane propyl)amino-1,3,5-triazine-2,4-dithiol, 6-trimethoxysilyl propyl amino-1,3,5-triazine-2,4-di(amino ethyl)amine, and 6-6-trimethoxy silyl propyl amino-1,3,5-triazine-2,4-diazide; or the silane derivatives such as a silane coupling agent having active silyl group for forming a siloxane bond which is at least one selected from the group consisting of a hydrosilyl-containing silyl group, a vinyl-containing silyl group, an alkoxysilyl-containing silyl group, and a hydrolyzable group-containing silyl group.

The molecular adhesive agent makes molecular-bonding generate after preparing solution or suspension thereof and applying it onto the surface of the materials to be adhered through coating, spraying or dipping. It is preferable that the concentration of the solution or suspension is 0.01-10 wt. %, the dipping time is 0.1-10 minutes, and the dipping temperature is 20-60° C.

The molecular adhesive agent may be applied onto either surface to be bonded among the materials to be adhered, or onto both surfaces to be bonded among the materials to be adhered. At least one of the materials is applied with the molecular adhesive agent, and both materials are stuck on the surfaces to be adhered, and are exposed at room temperature or heat condition under optionally reduced or increased pressure to be adhered through the molecular bonding.

(Use Method of the Three-Layer Structure)

The object $5b$ to be measured for estimating thermal characteristics of the three-layer structure of the measurement sample unit 5 in the measurement device 1 for estimating thermal characteristics, is provided as 1 piece or plural pieces of 2 pieces or more. The relationship between the total thermal resistance and thickness thereof is determined through preferable measurement at 3 points or more by using the three-layer structure which comprises the object $5b$ to be measured for estimating thermal characteristics having 0.0001 mm-20 mm thickness per one piece.

Figure 9:
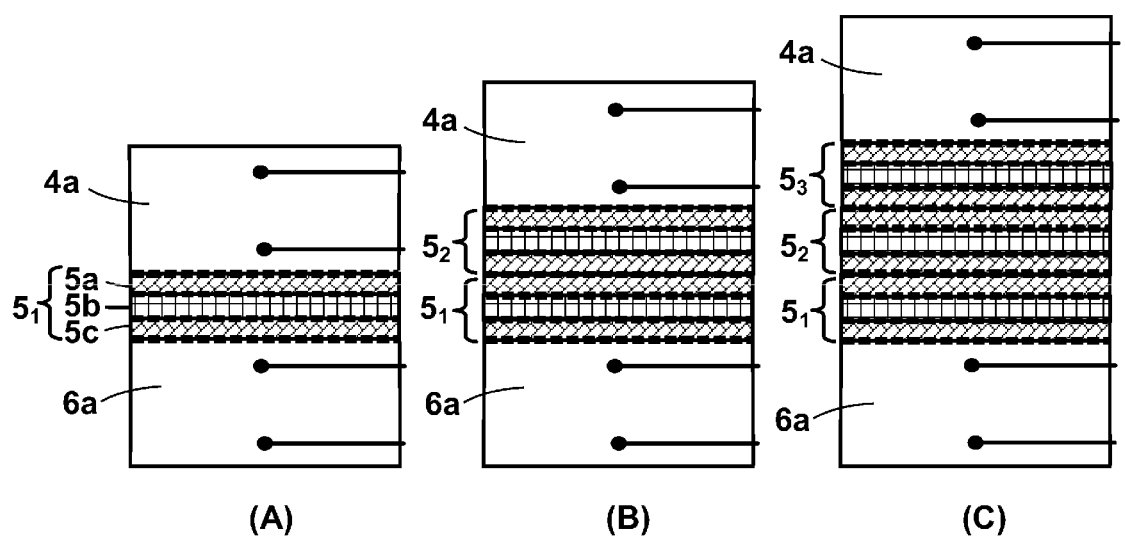
FIG. 9 is a schematic general view that shows a state where the heat insulation plates and single set or stacked plural sets of the heat conducting material made of metal/the object to be measured/the heat conducting material made of metal, which construct the three-layer structure as the measurement sample unit of the measurement device for estimating thermal characteristics of the present invention, are stacked.

In the measurement device 1 for estimating thermal characteristics, when the object $5b$ to be measured for estimating thermal characteristics of the three-layer structure of the measurement sample unit 5 is measured by using one set (see 5 in FIG. 8) or by stacked plural sets (see $5_1$, $5_2$ and $5_3$ in FIG. 9) of the two or more sets of the three-layer structure, the thermal characteristics of complex constitution of the three-layer structure can be clarified.

As shown in FIG. 6, after the objective measurement sample $5b_1$ having complex shapes as the object $5b$ to be measured for estimating thermal characteristics of the three-layer structure of the measurement sample unit 5 in the measurement device 1 for estimating thermal characteristics is embedded into a silicone liquid rubber $5b_2$, the silicone rubber composition is hardened to became the rubber in order to become the three-layer structure in which Al plates as the heat conducting materials (the metallic plates) $5a$ and $5c$ are physically contacted or chemically contacted at the upper side and the down side. Although the thermal characteristics have not enabled to be measured due to the complex, it is enabled to be measured as the average values of the thermal characteristics by using thus three-layer structure. Incidentally, the values of overall laminated structure is used as the measured values, and the value of thermal resistance of the silicone rubber is used as calculated values by using 0.20 W/mK of well-known thermal conductivity thereof.

After the objective measurement sample unit $5b_1$ having complex shapes as the object $5b$ to be measured for estimating thermal characteristics of the three-layer structure of the measurement sample unit 5 in the measurement device 1 for estimating thermal characteristics is embedded into a silicone liquid rubber $5b_2$, one set or plural set of 2 sets or more of the three-layer structures in which Al plates are physically contacted or chemically contacted at the upper side and the down side are stacked. Thereby, heat conducting mechanism between the metallic plates as the heat conducting materials $5a$ and $5c$ and the measurement sample or processing methods for advantageous heat conducting are enable to be developed.

According to the measurement device 1 for estimating thermal characteristics, all of the value of contact thermal resistance, the value of thermal resistance and the thermal conductivity can be respectively measured as each average value by using the same measurement sample. The measurement device 1 for estimating thermal characteristics is suitable to estimate or measure the thickness of the object $5b$ to be measured for estimating thermal characteristics within 0.001-10 mm per 1 piece, the value of contact thermal resistance and the value of thermal resistance of the object to be measured within $0.001*10^{-3}$ m² K/W-1 m² K/W, and the thermal conductivity of the object $5b$ to be measured for estimating thermal characteristics within 0.1 W/mK-15 W/mK.

(Determining Method for the Thermal Characteristics of the Three-Layer Structure)

For the thermal characteristics (the contact thermal resistance, the thermal resistance and the thermal conductivity) of the object $5b$ to be measured for estimating thermal characteristics, at the beginning, two pieces of metallic plates as the heat conducting materials $5a$ and $5c$ having 1*22*22 mm cubic and the object $5b$ to be measured for estimating thermal characteristics having arbitrary thickness (Lx, $10^{-3}$ m) are used as total of three pieces having different thickness to prepare 3 sets of the three-layer structures by using 20 as previous mentioned (see FIG. 7). Next, the three-layer structure is inserted into the measurement sample unit 5 in the measurement device 1 for estimating thermal characteristics, and then the constant pressure (0.01-3 MPa) is loaded to the three-layer structure of the measurement sample unit 5. The stabilized power supply 9c of direct current electricity and the cooling-water circulating system 10 are switched on. In this instance, the heat is cooled from the heat generating source 4b through the upper-side heat-collection metallic block 4c, the three-layer structure and the down-side heat-collection metallic block 6a by the heat cooling source unit. The processes are shown in FIG. 8.

The thermal characteristics (the contact thermal resistance, the thermal resistance and the thermal conductivity) of the object 5b to be measured for estimating thermal characteristics are calculated according to the following expression 1 by using the total value of thermal resistance (Rt, mK/W) as sum of the value of contact thermal resistance (Rc, mK/W) between the heat conducting materials 5a and 5c as the metallic plates of the three-layer structure and the object 5b having a constant thickness (Lx, $10^{-3}$ m) to be measured for estimating thermal characteristics and the value of thermal resistance (Rs, mK/W) of the object to be measured, the cross-section area (A) of the object 5b to be measured for estimating thermal characteristics, the temperature difference ($\Delta T$) between the surface temperature $T_1$ and $T_7$ of the heat conducting materials 5a and 5c as the metallic plates of the three-layer structure, and the electricity ($\Phi$), W).

[Expression 1]

$$Rt = A^* \Delta T / \Phi \qquad \text{expression 1}$$

In the above expression 1, $\Phi$ is calculated from voltage E1 of the electric source of the heater and current i ((voltage E2 of the electric shunt)/(value of resistance Ro). The results thereof are shown in Table 1.

TABLE 1

Thickness, electricity, surface area, temperature difference, and total value of thermal resistance of object to be measured of three-layer structure

| Thickness of Object to be Measured (mm) | Electricity (W) | Surface Area: A ($10^{-3}$ m²) | Temperature Difference: $\Delta T$ (k) | Total Value of Thermal Resistance: Rt ($10^{-3}$ m²K/W) |
|---|---|---|---|---|
| 1.0 | 20.1 | 0.484 | 2.22 | 0.243 |
| 3.0 | 20.1 | 0.484 | 3.44 | 0.528 |
| 5.0 | 20.1 | 0.484 | 4.86 | 0.724 |

In the antecedent, when the thickness (1.0, 2.0, 3.0 mm) of the object 5b to be measured for estimating thermal characteristics are fluctuated and then the thicknesses are plotted on the horizontal axis and the total value of thermal resistances are plotted on the vertical axis, the following linear relational expression 2 is obtained.

[Expression 2]

$$Rt = a\, Lx + b \qquad \text{expression 2}$$

The value of contact thermal resistance (Rc) is obtained from the intercept (b) thereof. The value of thermal resistance (Rs) of the object to be measured is obtained by subtracting the value of contact thermal resistance from the total value of thermal resistance. And the thermal conductivity ($\lambda$, W/m×K) of the object to be measured is obtained by dividing the thickness of the object to be measured by the value of thermal resistance. The results are shown in Table 2 as the measurement method for estimating thermal characteristics.

TABLE 2

Total value of thermal resistance (Rt) of object to be measured of three-layer structure, value of contact thermal resistance (Rc), and value of thermal resistance (Rs) and thermal conductivity ($\lambda$s) of object to be measured

| Thickness (mm) | Total Value of Thermal Resistance: Rt ($10^{-3}$m²K/W) | Value of Contact Thermal Resistance: 2Rc ($10^{-3}$m²K/W) | Value of Thermal Resistance: Rs ($10^{-3}$m²K/W) | Total Value of Thermal Resistance Rto ($10^{-3}$m²K/W) | Thermal Conductivity: $\lambda$s (W/mK) | |
|---|---|---|---|---|---|---|
| 1.0 | 0.243 | 0.128 | 0.115 | 0.007 | 8.69 | 8.19 |
| 3.0 | 0.528 | 0.128 | 0.400 | 0.007 | 7.50 | (Average) |
| 5.0 | 0.724 | 0.128 | 0.596 | 0.007 | 8.39 | |

Embodiments

Hereunder, embodiments of a measurement method for estimating thermal characteristics using a measurement device for estimating thermal characteristics of the present invention will be explained in detail. However, the scope of the present invention is not restricted by those embodiments.

Example 1

Embodiment Indicating Reasons for Occasion of Using Measurement Device for Estimating Accurate Thermal Characteristics As shown above, the thermal conductivity has been focused as an evaluation criterion of the heat conducting material. Thereby, reputations, in which the heat conducting materials having high thermal conductivity are excellent, are dominated in the industry world. Thus reputations may shake bases for manufacturing, those consequently cause to loss confidences of Japanese industries. Accordingly, the results of measurement of the value of thermal resistance and the thermal conductivity of the object 5b to be measured for estimating thermal characteristics by using the measurement device 1 for estimating thermal characteristics are indicated in Table 3.

TABLE 3

Thermal conductivity of heat conducting material sheet having 0.2 mm as values in catalogs and results of measurement by using the present device

| | | Thermal Characteristics in Catalog | | | | |
|---|---|---|---|---|---|---|
| Examples | Company | Thermal Conductivity W/mK | Value of Contact Thermal Resistance $10^{-3} m^2 K/W$ | Value of Thermal Resistance $10^{-3} m^2 K/W$ | Total Value of Thermal Resistance (0.2 mm) $10^{-3} m^2 K/W$ | Thermal Conductivity by using Present Device W/mK |
| Comparative Example 1 | A | 9-11 | 0.0283 | 0.0132 | 0.041 [*2] | 14.5 |
| Comparative Example 2 | B | 3.8 | 0.128 | 0.0230 | 0.151 | 8.19 |
| Comparative Example 3 | C | 4.0 | 0.0195 | 0.0390 | 0.048 [*3] | 5.11 |
| Comparative Example 4 | D | 6.2 | 0.228 | 0.0052 | 0.232 | 7.99 |
| Comparative Example 5 | E | 1.5 | 0.215 | 0.0544 | 0.269 | 3.85 |
| Comparative Example 5 | F | 2.8 | 0.0971 | 0.0629 | 0.160 | 4.0 |
| Example 1 | SCL Inc. | — | 0.009 | 0.0242 | 0.025 [*1] | 4.18 |

Heat-transfer Promoting Agent 1 (Pure Water 95 g + Liquid Kitchen Detergent 5 g): 10 mg/4.84 $cm^2$ Al Plate (Surface Roughness; 0.02 μm, Thermal Conductivity; 240 W/mK)

Measurement Pressure: 0.3 MPa

[*1] to [*3] indicate top 3 of the total Value of Thermal Resistance

Products as the heat conducting material (the object to be measured for estimating thermal characteristics), which is manufactured and sold by Companies of A, B, C, D, E and F, were formed into the three-layer structures. Results of the three-layer structures, and results of a development article of Sulfur Chemical Laboratory Inc. (SCL Inc.), both which were measured by using the measurement device for estimating thermal characteristics, were obtained as Table 3. The results were indicated in Table 3, all which were converted into values of thermal characteristics of the object to be measured as 0.2 mm (pressure 0.3 MPa). The reason of limitation of 0.2 mm is that there are a lot of products having thickness of about 0.2 mm or less under practical, experimental or inspectional occasions. The values of the thermal conductivity in the catalogs of every company are generally smaller than the values obtained by the measurement device for estimating thermal characteristics. The sum of the value of the contact thermal resistance and the value of thermal resistance of the object to be measured means the total value of thermal resistance. Top 3 of the total value of thermal resistance and top 3 of the thermal conductivity are different each other. The development article (Example 1) of SCL Inc. was the heat conducting material having 4.18 W/mK. However, it indicates $0.025*10^{-3}$ $m^2$ K/W of the total value of thermal resistance which was extremely smaller than the value of the product of company A having 14.5 W/mK. Nevertheless, the article of SCL Inc. was more superior than the product of company A practically, because the specific difference from the products is the low value of contact thermal resistance. The value of contact thermal resistance of the heat conducting materials having 0.2 mm or less in use affects the heat-transfer rather than the thermal conductivity.

Examples 2-6

Embodiments Using Stacked Plural Sets of the Three-Layer Structure

As above mentioned in previous paragraphs, the three-layer structures were prepared by using the jig 20 for forming thereof (see FIG. 7), which consisted of two pieces of copper plates (swaging copper foils, 0.175 mm) as the heat conducting materials 5a and 5c and a sheet having 22 mm square in a quadrate shape as the object 5b to be measured for estimating thermal characteristics (thickness: 0.120 mm) which was cut from a heat conducting complex (a heat conducting sheet consisting of 100 parts by weight and silicone rubber and 1500 parts by weight of $Al_2O_3$). One set to five sets of the three-layer structures were stacked and then inserted into the measurement sample unit 5 in the measurement device 1 for estimating thermal characteristics. In those cases, the contacting gaps between the Al plates as the upper-side heat-collection metallic block 4c or the down-side heat-collection metallic block 6a and the copper plates as heat conducting materials 5a or 5c of the measurement device for estimating thermal characteristics, and between the copper plates of the plural set of three-layer structure were entirely applied with 10 mg of the heat-transfer promoting agent respectively so as to be spread. The heat-transfer promoting agent was wiped up for each stacked three-layer structure, and was dried then applied thereon again. The measurement results for estimating thermal characteristics are indicated in Examples 2-6 in Table 4.

TABLE 4

Measurement examples of one set to five sets of the three-layer structure of Cu (175 μm)/object to be measured (120 μm)/Cu (175 μm)

| | | Sample | | Thermal Characteristics | | | | |
| --- | --- | --- | --- | --- | --- | --- | --- | --- |
| | | | | Value of Thermal Resistance | | | λ (W/mK) | |
| Example | Nos. of Piece | Whole Thickness (μm) | Object to be Measured (μm) | of Sets of Three-layer Structure ($10^{-3} m^2 K/W$) | Intercept Rtc ($10^{-3} m^2 K/W$) | Value of Volume Resistance Rs ($10^{-3} m^2 K/W$) | Three-layer Structure | Object to be measured |
| Example 2 | 1 | 0.470 | 0.120 | 0.039 | 0.0113 | 0.0277 | 12.05 | 4.33 |
| Example 3 | 2 | 0.939 | 0.240 | 0.065 | | 0.0537 | 14.45 | 4.55 |
| Example 4 | 3 | 1.408 | 0.360 | 0.090 | | 0.0787 | 15.64 | 4.57 |
| Example 5 | 4 | 1.875 | 0.480 | 0.122 | | 0.1107 | 15.36 | 4.34 |
| Example 6 | 5 | 2.345 | 0.600 | 0.140 | | 0.1287 | 16.75 | 4.66 |

Load: 0.5 MPa, Electricity: 20 W, ΔT: 1.38-4.97° C., Cu175/Rs120/Cu175 μm Rt = Rs + 2Rtc, λ = L/Rs Heat-transfer Promoting Agent 1 (Pure water 95 g + Liquid Kitchen Detergent 5 g): 10 mg/4.84 $cm^2$, Al Plate (Surface Roughness; 0.02 μm, Thermal Conductivity; 240 W/mK), Measurement Pressure: 0.3 MPa The numbers of piece means the numbers of stacked sets of the three-layer structure. Total thickness means the thickness in which the three-layer structures were stacked under the load of 0.5 MPa. The thickness of one set of the three-layer structure of the object $5b$ to be measured for estimating thermal characteristics was within 0.120 mm±0.001 mm. The value of thermal resistance of the stacked plural sets of the three-layer structure means the total value of thermal resistance of the stacked plural sets of the three-layer structure, which consisted of Cu (0.175 mm)/the object to be measured (0.120 mm)/Cu (0.175 mm). Rtc was obtained by plotting relationships of the total thickness and the value of thermal resistance of the stacked plural sets of the three-layer structure, and then calculating a value of an intercept: Rtc (namely, the value of thermal resistance when thickness was 0; it means the value of contact thermal resistance). When subtracting Rtc from the value of thermal resistance of the stacked plural sets of the three-layer structure, the value of thermal resistance of the object to be measured having different thickness was obtained. Each of while values of thermal resistance was obtained by dividing by the total thickness the value of thermal resistance of the stacked plural sets of the three-layer structure. The thermal conductivity of the stacked plural sets of the object to be measured was obtained by dividing the thickness of the object to be measured by the value of the volume resistance (Rs) of the object to be measured.

Although the three-layer substrate, in which thick copper plates were put in at both side, indicated high thermal conductivity altogether, that of the object to be measured was ca. 4 W/mK. For one set of the three-layer structure, a rate of the value of contact thermal resistance was large as 29%. This value was obtained under compression of 0.5 MPa. In a case when the condition is ca. 0.10 MPa as a usual usage, it is expected that the value increases double or more of 29%.

Examples 7-9, Comparative Examples 7-8, and Reference Example 1

Embodiments by Using Various Heat-Transfer Promoting Agents 20 mg/4.84 cm$^2$ of various heat-transfer promoting agents were dropped by a dropper on the surface of the down-side heat-collection metallic block $6a$ (Al alloy, the thermal conductivity: 139 W/mk, Ra: 0.025 μm) arranged under the measurement sample unit 5 in the measurement device 1 for estimating thermal characteristics. They were smoothened with a glass rod, and then the overflowed agents were wiped up. Thereby, the heat-transfer promoting agents were applied within 10 mg±2 mg. Next, the upper-side heat-collection metallic block $4c$ (Al alloy, the thermal conductivity: 139 W/mk, Ra: 0.025 μm) was mounted onto the measurement sample unit 5 to be positioned. And then the load of 0.2 MPa was applied thereto, and the thin layer of the heat-transfer promoting agent was formed in the gap between the metallic blocks $4c$ and $6a$. The results thereof are shown in Table 5. Incidentally, Comparative Example 7 in Table 5 indicates the case when water under atmospheric pressure was replaced instead of the heat-transfer promoting agent for the above-mentioned Examples. Comparative Example 8 in Table 5 indicates the case when a commercial item of a gel compound for heat radiation (G746 which is available from Shin-Etsu Chemical Co. Ltd., the thermal conductivity: 1.9 W/mK) was used. And Reference Example 1 in Table 5 indicates the case when air of atmospheric pressure was replaced instead of the heat-transfer promoting agent for the above-mentioned Examples.

TABLE 5

Comparison of values of contact thermal resistance

| | | Value of Contact Thermal Resistance ($10^{-3}$m$^2$K/W) | | | | | | |
|---|---|---|---|---|---|---|---|---|
| | | 10 min | 20 min | 30 min | 40 min | 50 min | 60 min | Average Value |
| Example 7 | Heat-transfer Promoting Agent 1 | 0.0140 | 0.0140 | 0.0141 | 0.0147 | 0.0150 | 0.0155 | 0.0145 ± 0.0005 |
| Example 8 | Heat-transfer Promoting Agent 2 | 0.0120 | 0.0125 | 0.0126 | 0.0124 | 0.0123 | 0.0122 | 0.0123 ± 0.0003 |
| Example 9 | Heat-transfer Promoting Agent 3 | 0.0086 | 0.0089 | 0.0086 | 0.0088 | 0.0087 | 0.0088 | 0.0087 ± 0.0002 |
| Comparative Example 7 | Pure Water | 0.0190 | 0.0330 | 0.0393 | 0.0439 | 0.0475 | 0.0487 | 0.0081 ± 0.011 |
| Comparative Example 8 | G746 (Compound) | 0.0382 | 0.0379 | 0.0376 | 0.0374 | 0.0372 | 0.0370 | 0.0376 ± 0.0006 |
| Reference Example 1 | Air | 0.297 | 0.2992 | 0.3000 | 0.2986 | 0.29991 | 0.2985 | 0.298 ± 0.011 |

Heat-transfer Promoting Agent 1: Pure Water 95 g + Liquid Kitchen Detergent 5 g
Heat-transfer Promoting Agent 2: Water 96.69 g + Isostearyl Sulfonic Acid Sodium Ester 2.1 g + Sodium Lactate 1.2 g, Triazine Trithiol monosodium 0.001 g
Heat-transfer Promoting Agent 3: Pure Water 99 g + Oleyl Sulfonic Acid Ester Triethanolamine 0.8 g + Sodium Phosphite 0.1 g + Resorcin 0.1 g
Heat-transfer Promoting Agent: 10 mg/4.84 cm$^2$
Al Plate (Surface Roughness; 0.02 μm, Thermal Conductivity; 240 W/mK),
Measurement Pressur: 0.3 MPa There was the physical contact between metals obtained by contact pressure on the interface gap between the metallic blocks. The distance between thus physical contacts was within 0.5 nm or less, and the heat thereof conducted by phonon oscillation. In the air space (Reference Example 1), the energy was exchanged by not only physical oscillation but also collision of molecules of oxygen and nitrogen to the interface wall of the metallic blocks. Although the pure water (Comparative Example 7) was an efficient substance (hydrogen bond molecules as water molecules) which received the energy from the wall having higher temperature (the wall of Al alloy block: the upper-side heat-collection metallic block 4c) and released (radiated) the energy to the wall having lower temperature (the wall of Al alloy block: the down-side heat-collection metallic block 6a) in the gap of contact interface of the metallic blocks, the value of contact thermal resistance between the metallic blocks increased with time because the water vaporized with time. Although the heat conductivity of the commercially available radiation material (Comparative Example 8) was higher at initial than that of water because the material comprised silicone oil and inorganic radiation materials ($Al_2O_3$ particles, 1 μm or less), change with time was small.

The values of thermal resistance in the gap between the metallic blocks in the embodiments using the heat-transfer promoting agent of Examples 7-9 were kept as small and constant values for 60 min. compared to above-mentioned Comparative Examples 7-8 and Reference Example 1. It is expected that the vaporization of water and the transform between single molecule and cluster from water cluster with hydrogen bond are smoothly occurred, and then the energy transfers in the gap between the metallic blocks by minor addition of the surface active agent and the builder.

Examples 10-12, Comparative Example 9, and Reference Example 2

Embodiments for Indicating Relationship Between the Heat-Transfer Promoting Agent and Contact Pressure It was important whether the values of thermal resistance of the heat-transfer promoting agent were influenced or not by contact pressure which was loaded to the metallic blocks when the heat-transfer promoting agent was filled into the gap between the measurement sample unit 5 and the down-side heat-collection metallic block 6a (Al alloy, thermal conductivity: 139 W/mk, Ra: 0.025 μm) arranged thereunder in the measurement device 1 for estimating thermal characteristics, because the pressure onto the object to be measured predominated over the value of contact thermal resistance. The results under the contact pressure of 0.01-0.30 MPa are shown in Table 6.

TABLE 6

Relationship between heat-transfer promoting agent in contact gap of Al/Al and contact pressure

| Examples | Contact Pressure (MPa) | Value of Contact Thermal Resistance ($10^{-3} m^2 K/W$) | | | | | | | Average Value |
|---|---|---|---|---|---|---|---|---|---|
| | | 0.01 | 0.05 | 0.10 | 0.15 | 0.20 | 0.25 | 0.30 | |
| Example 10 | Heat-transfer Promoting Agent 1 | 0.0150 | 0.0150 | 0.0150 | 0.0144 | 0.0146 | 0.0143 | 0.0140 | 0.0145 ± 0.0002 |
| Example 11 | Heat-transfer Promoting Agent 2 | 0.0126 | 0.0125 | 0.0124 | 0.0123 | 0.0123 | 0.0122 | 0.0121 | 0.0123 ± 0.0003 |
| Example 12 | Heat-transfer Promoting Agent 3 | 0.0078 | 0.0077 | 0.0076 | 0.0076 | 0.0077 | 0.0078 | 0.0078 | 0.0077 ± 0.0001 |
| Comparative Example 9 | G746 (Compound) | 0.0481 | 0.0399 | 0.0372 | 0.0352 | 0.0329 | 0.0299 | 0.0282 | 0.0390 ± 0.0199 |
| Reference Example 2 | Air | 0.1977 | 0.1787 | 0.1660 | 0.1589 | 0.10505 | 0.1440 | 0.1380 | 0.1678 ± 0.0298 |

Heat-transfer Promoting Agent 1: Pure Water 95 g + Liquid Kitchen Detergent 5 g

Heat-transfer Promoting Agent 2: Water 96.69 g + Isostearyl Sulfonic Acid Ammonium 2.1 g + Sodium Lactate 1.2 g, Triazine Trithiol monosodium 0.001 g Heat-transfer Promoting Agent 3: Pure Water 99.0 g + Oleyl Sulfonic Acid Ester Triethanolamine 0.8 g + Sodium Phosphite 0.1 g + Resorcin 0.1 g Heat-transfer Promoting Agent: 10 mg/4.84 $cm^2$ Al Plate (Surface Roughness; 0.02 μm, Thermal Conductivity; 240 W/mK), Measurement Pressur: 0.3 MPa Although the value of contact thermal resistances in Comparative Example 9 and Reference Example 2 were affected by the contact pressure, those of Examples 10, 11 and 12 were hardly affected thereby. A pressure ratio of Comparative Example 9 was 0.3 MPa/0.01 MPa=0.58 and a pressure ratio of Reference Example 2 was 0.7, while pressure ratios of Examples 10-12 are 93-97. Therefore, the heat-transfer promoting agents of Examples were considerably excellent rather than the commercial items.

Examples 13-15, Comparative Example 10, and Reference Example 3

Embodiments for Indicating Relationship Between Surface Roughness and Contact Pressure It was important whether the values of thermal resistance of the heat-transfer promoting agent were influenced or not by the surface roughness of the metallic blocks when the heat-transfer promoting agent was filled into the gap between the measurement sample unit 5 and the down-side heat-collection metallic block 6a (Al alloy, thermal conductivity: 139 W/mk, Ra: 0.025 μm) arranged thereunder in the measurement device 1 for estimating thermal characteristics. The results under the surface roughness from 0.020±0.01 to 0.30±0.02 are shown in Table 7.

TABLE 7

Relationship between mediums in contact gap of Al/Al and surface roughness

| Examples | Surface Roughness (μm) | Value of Contact Thermal Resistance ($10^{-3} m^2 K/W$) | | | | |
|---|---|---|---|---|---|---|
| | | 0.020 ± 0.01 | 0.020 ± 0.01 | 0.05 ± 0.01 | 0.10 ± 0.01 | 0.30 ± 0.02 |
| Example 13 | Heat-transfer Promoting Agent 1 | 0.0146 | 0.0143 | 0.0146 | 0.0150 | 0.0151 |
| Example 14 | Heat-transfer Promoting Agent 2 | 0.0123 | 0.0123 | 0.0124 | 0.0123 | 0.0123 |
| Example 15 | Heat-transfer Promoting Agent 3 | 0.0066 | 0.0066 | 0.0067 | 0.0068 | 0.0068 |
| Comparative Example 10 | G746 (Compound) | 0.0372 | 0.0386 | 0.0401 | 0.0523 | 0.0882 |
| Reference Example 3 | Air | 0.1980 | 0.2010 | 0.5205 | 0.8120 | 1.2800 |

Heat-transfer Promoting Agent 1: Pure Water 95 g + Liquid Kitchen Detergent 5 g
Heat-transfer Promoting Agent 2: Ion-exchanged Water 97.5 g + Decyl Triethylene Glycol 2.0 g, EDTA 0.2 g + Triazine Trithiol monosodium 0.3 g
Heat-transfer Promoting Agent 3: Pure Water 98.2 g, Diphenyl Dioctyl Phoshoroyl Bromide 1.5 g, Triethanolamine 0.3 g, Sodium Hyposulfite 0.2 g
Contact Pressure: 0.2 MPa Although the roughness influence against the value of thermal resistance of Comparative Example 10 was 1.37 times and that of Reference Example 3 was 5.46 times, those of Examples 13, 14 and 15 were 0.1 or less in any cases. Therefore, it was obvious that the roughness influence is small, because of the characteristic of the surface active agent. Thus results mean new academic achievement as regards heat conduction on the interfaces.

Examples 16-17, Comparative Example 11

Figure 11:
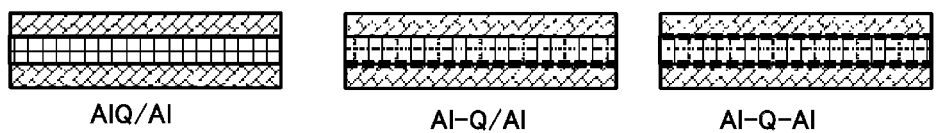
FIG. 11 is a graph that indicates a relationship between the pressure and the value of thermal resistance of the three-layer structure as the measurement sample unit, when the measurement device for estimating thermal characteristics which applies the present invention and a measurement device for estimating thermal characteristics which does not apply the present invention are used.
Figure 11:
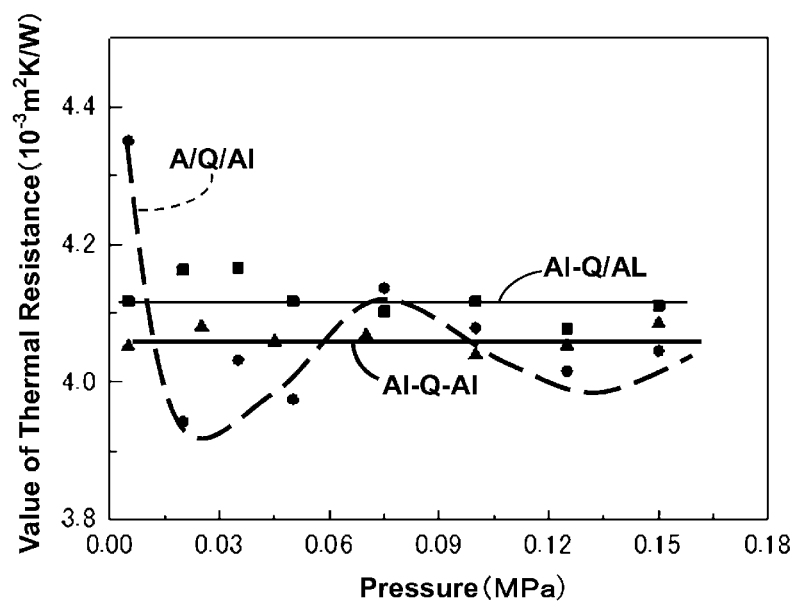

Embodiments for Indicating Influence of Physical Contact and Chemical Contact on Interface of Crosslinking Silicone Rubber of Three-Layer Structure Contact interfaces of the three-layer structure comprising 2 pieces of Al plate and crosslinking silicone rubber was investigated. And the results thereof are shown in FIG. 11. In Example 16, the first layer was contacted by the physical contact and the second layer was contacted by the chemical bond contact, and they were contacted by thus both contact procedures to the silicone rubber plates to be prepared. In Example 17, both layers were contacted by the same chemical contact. In Comparative Examples 11, both interfaces of two layers of the structure were contacted by the physical contact (intermolecular force) to be provided. The results thereof are shown in FIG. 11.

As shown in FIG. 11, the values of thermal resistance in the case of merely physical contact by using the crosslinking silicone rubber were varied in a wavelike fashion. It is predicted that expansion and contraction on the interface layer are caused by change of the load. On the other hand the values of thermal resistance in the case of the chemical contact on at least either interface layers were not affected by the contact pressure and were constant. Among them, in the case when both layers were contacted by the chemical contact, the values were not affected by the contact pressure stably and the lowest values of thermal resistance were represented. From thus result, it is obvious that the formation of the chemical bonding on the interface layer is needed so that the thermally-conductive three-layer structure for the practical, experimental or inspectional uses are not affected by any usage environment, and the lowest and stable heat conduction is occurred.

Examples 18-19, Comparative Example 12

Embodiments for Indicating Relationship of Medium on Contact Gap and Contact Pressure Various objects to be measured were investigated, and the results thereof are shown in Table 8. In the measurement for estimating thermal characteristics (Example 18) by using a heat-conductive complexed silicone rubber sheet (from the composition: 100 phr of SH851 silicone rubber which is available from Dow Corning Toray Co. Ltd., 200 phr of $Al_2O_3$-AS30 (30 μm) which is available from Showa Denko K.K., and 0.6 phr of RC-4; and under the condition: at 160° C., for 30 min., at 3 MPa) having 0.175 mm, the values of thermal resistance were $0.215$-$0.216*10^{-3}$ $m^2$ K/W and almost constant as regards relationship of the total values of thermal resistance and contact pressure onto the object to be measured. Therefore, it is obvious that the total values of thermal resistance indicate the independent property on the contact interface pressure by using the heat-transfer promoting agent. And the total values of thermal resistance when using a heat-conductive complexed silicone rubber sheet with adhered PI (Example 19; 0.2 mm), which was prepared by molecular bonding of the above-mentioned heat-conductive complexed silicone rubber sheet onto polyimide (PI, 25 μm, Kapton 250EN), were marginally decreased within $0.341*10^{-3}$ $m^2$ K/W to $0.333*10^{-3}$ $m^2$ K/W under 0.01-0.60 MPa of interface pressure and were affected by the contact interface pressure. However, the rate of change (2.4%) was very small. While the values of Comparative Example 12 without using the heat-transfer promoting agent were decreased within $0.421*10^{-3}$ $m^2$ K/W to $0.360*10^{-3}$ $m^2$ K/W, whose rate of change was 14.5%, and the values were strongly affected by the contact interface pressure. The results indicate that the heat-transfer promoting agent significantly promotes the contact heat-transfer between the Al plate of the three-layer structure and the object to be measured.

TABLE 8

Relationship between mediums in contact gap of Al/Al and contact interface pressure

| Examples | Object to be Measured | Heat-transfer Promoting Agent 10 mg/4.84 $cm^2$ | Total Value of Thermal Resistance ($10^{-3}m^2K/W$) Contact Interface Pressure on Object to be Measured (MPa) | | | | | | | |
|---|---|---|---|---|---|---|---|---|---|---|
| | | | 0.01 MPa | 0.05 MPa | 0.1 MPa | 0.2 MPa | 0.3 MPa | 0.4 MPa | 0.5 MPa | 0.6 MPa |
| Example 18 | 0.8 W Silicone Complexed Substrate | With | 0.216 | 0.216 | 0.215 | 0.215 | 0.215 | 0.215 | 0.215 | 0.215 |
| Example 19 | PI/Silicone Rubber Complexed Substrate | With | 0.341 | 0.340 | 0.338 | 0.336 | 0.335 | 0.334 | 0.333 | 0.333 |
| Comparative Example 12 | PI/Silicone Rubber Complexed Substrate | Without | 0.421 | 0.405 | 0.392 | 0.381 | 0.378 | 0.373 | 0.367 | 0.360 |

Heat-transfer Promoting Agent: Ion-exchanged Water 97.5 g + Decyl Triethylene Glycol 2.0 g, EDTA 0.2 g + Triazine Trithiol monosodium 0.3 g Examples 20-22, Comparative Examples 13-15

Embodiments for Indicating Relationship of Number of Stacked Pieces of Sheets of the Object to be Measured with or without Using Heat-Transfer Promoting Agent and Contact Interface Pressure When performing the measurements for estimating thermal characteristics (Examples 18, 19 and 20) by using heat-conductive complexed silicone rubber sheets (from the composition: 100 phr of SH851 silicone rubber which is available from Dow Corning Toray Co. Ltd., 600 phr of $Al_2O_3$-AS30 (30 μm) which is available from Showa Denko K.K., and 0.6 phr of PC-4; and under the condition: at 160° C., for 30 min., at 3 MPa) having 0.180 to 0.225 mm, the heat-transfer promoting agent of 10 mg/4.84 $cm^3$ was applied (Examples 20-22) onto 2 portions of the contact interface between the Al plate and the complexed sheet and onto 1 portion or 2 portions of the contact interface between the complexed sheets and the heat-transfer promoting agent was not applied (Comparative Examples 13-15). And 1-3 pieces of the complexed sheet were stacked, and then the relationship between the total value of thermal resistance and the object to be measured was measured. The results thereof are shown in Table 9.

TABLE 9

Influence for value of thermal resistance of object to be measured according to number of stacked sheets of object to be measured with or without using heat-transfer promoting agent and contact interface pressure

| Examples | Heat-transfer Promoting Agent | Number of Stacked Sheet Thickness of Sheet | Total Value of Thermal Resistance ($10^{-3} m^2 K/W$) Contact Interface Pressure (MPa) | | | | | | | |
|---|---|---|---|---|---|---|---|---|---|---|
| | | | 0.01 | 0.05 | 0.1 | 0.2 | 0.3 | 0.4 | 0.5 | 0.6 |
| Example 20 | With Agent of 10 mg/4.84 $cm^2$ | 1 Piece | 0.138 | 0.090 | 0.086 | 0.086 | 0.086 | 0.086 | 0.086 | 0.086 |
| Comparative Example 13 | Without Agent | 0.200 mm | 0.550 | 0.160 | 0.110 | 0.092 | 0.091 | 0.090 | 0.090 | 0.090 |
| Example 21 | With Agent of 10 mg/4.84 $cm^2$ | 2 Pieces | 0.206 | 0.176 | 0.174 | 0.174 | 0.174 | 0.174 | 0.174 | 0.174 |
| Comparative Example 14 | Without Agent | 0.200 mm | 0.750 | 0.280 | 0.220 | 0.197 | 0.191 | 0.188 | 0.185 | 0.182 |
| Example 22 | With Agent of 10 mg/4.84 $cm^2$ | 3 Pieces | 0.315 | 0.258 | 0.255 | 0.255 | 0.255 | 0.255 | 0.255 | 0.255 |
| Comparative Example 15 | Without Agent | 0.200 mm | 0.830 | 0.370 | 0.325 | 0.276 | 0.271 | 0.268 | 0.265 | 0.263 |

Heat-transfer Promoting Agent: Ion-exchanged Water 97.5 g + Decyl Triethylene Glycol 2.0 g, EDTA 0.2 g + Triazine Trithiol monosodium 0.3 g
Heat-transfer Promoting Agent 3: Pure Water 98.2 g, Diphenyl Dioctyl Phoshoroyl Bromide 1.5 g, Triethanolamine 0.3 g, Sodium Hyposulfite 0.02 g
Range of Thickness of Sheet: 0.220-0.240 mm
Value of Thermal Resistance corrected as thickness of sheet of 0.200 mm It was obvious that the application of the heat-transfer promoting agent achieves the effects of obtaining the constant total value of thermal resistance at the extremely low contact interface pressure (ca. 0.05 MPa) or more, of attaining the independent property on the contact interface pressure, and of obtaining the accurate values of measurement for the value of thermal resistance as well as under the usage state thereof. On the other hand, it was obvious that the case (Comparative Examples) without using the heat-transfer promoting agent causes the adverse effects of decreasing the total values of thermal resistance with increasing the contact interface pressure, of obtaining the significantly different value from the actually-used contact interface pressure, of attaining the dependent property on the contact interface. Therefore the measured values of thermal resistance of the complexed materials were not exerted unless the interface pressure for the measurement is loaded. When they are used for small parts such as an inverter and LED, the increase of the contact interface pressure causes the difficult usage of larger and heavier components.

Examples 20-22, Comparative Examples 13-15

Embodiments for Indicating Relationship of Thickness and the Total Value of Thermal Resistance of the Object to be Measured A laser reflecting type short range sensor head GT2-S1 as a pencil type, which is available from Keyence Corporation and is a trade name, was used for the length measuring device 8 attached into the measurement device 1 for estimating thermal characteristics. The length measuring device 8 was a displacement gauge with high-sensitivity within 1 μm±0.1 μm or more. The length measuring device 8 was mounted onto the heat conducting material 5a as the upper-side supporting plate, and can measure the displacement distance from the heat conducting material 5c as the down-side supporting plate by the mechanism thereof. After the interface pressure (0.2 MPa) was loaded, the displacement distance was changed. In this time, the thickness of the object 5b to be measured for estimating thermal characteristics as the sample changed with the loaded interface pressure. The value of thermal resistance was simultaneously expressed as the value according to the thickness with change of the present interface pressure. In Examples 20-22 and Comparative Examples 13-15, for example, the objects 5b to be measured for estimating thermal characteristics having thickness of 0.2004 mm, 0.4040 mm and 0.6015 mm, which were measured as previously mentioned, were used. The heat conducting material 5a, the object 5b to be measured for estimating thermal characteristics, and the heat conducting material 5c in the measurement device 1 for estimating thermal characteristics were sandwiched and kept between the upper-side heat-collection metallic block 4c and the down-side heat-collection metallic block 6a, and then the values of thermal resistance were obtained by three-point plotting according to the total value of thermal resistance and the thickness of the samples.

In Comparative Examples 13-15, the thickness of the sample to be measured was not corrected. And the value of contact thermal resistance on the contact interface which was calculated by using the same thickness of the sample to be measured even if the interface pressure was varied, the value of thermal resistance of the sample to be measured, and the thermal conductivity were obtained. In Examples 20-22, the thickness of the object 5b to be measured for estimating thermal characteristics as the sample after loading the interface pressure was measured by the length measuring device 8, and then the value of contact thermal resistance on the contact interface, the value of thermal resistance of the sample to be measured, and the thermal conductivity were obtained. The results are shown in Table 10 and FIG. 12.

Figure 12:
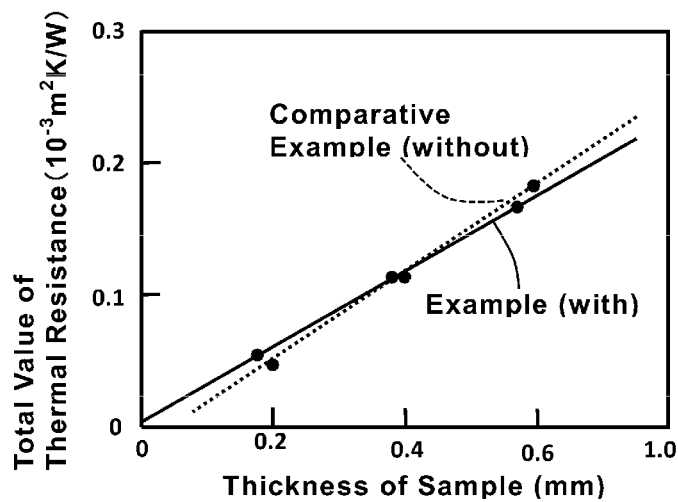
FIG. 12 is a graph that indicates a relationship between the thickness of the object to be measured and total value of thermal resistance, when the measurement device for estimating thermal characteristics which applies the present invention and a measurement device for estimating thermal characteristics which does not apply the present invention are used.

As shown in Table 10 and FIG. 12, the value of contact thermal resistance on contact interface were indicated as value of minus in Comparative Examples 13-15, because of constriction by the interface pressure. However, the value of contact thermal resistance on contact interface were indicated as value of plus of 0 or more in Examples 20-22 because of obtaining the accurate thickness. Accordingly, the values of thermal resistance in Examples 20-22 were indicated as the more accurate values, and the thermal conductivity thereof was indicated as accurate or higher values than those of Comparative Examples 13-15.

INDUSTRIAL APPLICABILITY

The measurement device for estimating thermal characteristics and the measurement method for estimating thermal characteristics using the same of the present invention can apply the thermal measurement and analysis technology of the parts for usage of the various electric or electronic products such as the light emitting elements, the photoelectric conversion elements, the thermoelectric conversion elements, the wind turbine generation elements, the printed circuit boards, the semiconductor chips, a wide variety of the electric control elements or parts of the motors or the engines of the automobiles etc. The measured materials thereby can be used to be installed into the products.

EXPLANATIONS OF LETTERS OR NUMERALS

Numerals mean as follows. 1: measurement device for estimating thermal characteristics, 2: transparent plastic case having window for taking in and out, 3: load unit, 3a: load screw rod, 3b: SUS screw-cut plate, 3c: SUS load plate, 3d: load cell, 3e: heat insulation plate, $3f_1$, $3f_2$: distortion gauge, 3g: guide, $3h_1$, $3h_2$: wirings for distortion gauge measurement, 4: heat generating source unit, 4a: heat insulation plate, 4b: heat generating source, 4c: upper-side heat-collection metallic block, $4d_1$, $4d_2$: insulating resin, 4e: electrothermal heater, 4f: wire, $4g_1$, $4g_2$: thermocouples, $4h_1$, $4h_2$: wire for a high-precision temperature-voltage measuring unit, 5, $5_1$, $5_2$, $5_3$: a measurement sample unit, $5a_1$: layer of heat-transfer promoting agent, 5a: heat conducting material, 5ab: contact interface of heat conducting material/

TABLE 10

Influence for relationship of total value of thermal resistance and thickness of object to be measured, according to value of thermal resistance of object to be measured, value of contact thermal resistance on contact interface, and thermal conductivity with or without using length measuring device

| | Before/After Using Length Measuring Device | Thickness of Object to be Measured (mm) | Total Value of Thermal Resistance ($10^{-3}m^2K/W$) | Value of Thermal Resistance of Object to be Measured ($10^{-3}m^2K/W$) | Value of Contact Thermal Resistance on Contact Interface ($10^{-3}m^2K/W$) | Thermal Conductivity (W/mK) |
|---|---|---|---|---|---|---|
| Example 20 | After Measurement | 0.1882 | 0.04820 | 0.04297 | 0.00523 | 4.38 |
| Comparative Example 13 | Before Measurement | 0.2004 | 0.04582 | | −0.0150 | 4.36 |
| Example 21 | After Measurement | 0.3836 | 0.90101 | 0.08584 | 0.00523 | 4.49 |
| Comparative Example 14 | Before Measurement | 0.4040 | 0.11210 | | −0.0150 | 3.60 |
| Example 22 | After Measurement | 0.57761 | 0.13404 | 0.12881 | 0.00523 | 4.48 |
| Comparative Example 15 | Before Measurement | 0.6015 | 0.17519 | | −0.0150 | 3.43 | object to be measured, $5b$, $5b_1$: object to be measured for estimating thermal characteristics, $5b_2$: silicone liquid rubber, $5bc$: contact interface of object to be measured/heat conducting material, $5c$: heat conducting material, $5c_1$: layer of heat-transfer promoting agent, 6: heat cooling source unit, $6a$: down-side heat-collection metallic block, $6b$: thermal exchange cooling device, $6c_1$, $6c_2$: thermocouple, $6d_1$, $6d_2$: wire for high-precision temperature-voltage measuring unit, $6e_1$: inflow hole of cooling water, $6e_2$: outflow hole of cooling water, 7: a support unit, $7a$: heat insulation material, $7b$: stillage, $7c_1$, $7c_2$: pedestal having a cone shape, 8: length measuring device, $8a_1$, $8a_2$: gauge head of length measuring device, $8b_1$, $8b_2$: wire for length measuring unit, 9: data acquisition and control system, $9a$: distortion measuring unit, $9b$: high-precision temperature-voltage measuring unit, $9c$: a stabilized power supply of direct current electricity, $9d$: electric shunt, $9e$: measurement and calculation unit for estimating thermal characteristics, $9f$: external output interface unit, $9g$: length measurement unit, 10: cooling-water circulating system, $10a$: tank of stored cooling water for circulation, $10b$: cooling-water circulating equipment, 11: data-indicating system, $11a$: memory, $11b$: display, 20: jig for building, $21a$, $21b$: right and left outer frame, 22: bolt, 23: upper-side spacer, 24: nut, 25: down-side spacer, $T_1$: surface temperature of upper-side heat-collection metallic block, $T_7$: surface temperature of down-side heat-collection metallic block

What is claimed is:

1. A measurement device for estimating thermal characteristics comprising:
    a measurement sample unit;
    a heat generating source unit that has heat sensors for detecting heat radiating toward the measurement sample unit, and that heats the measurement sample unit;
    a heat cooling source unit that has heat sensors for detecting heat radiating from the measurement sample unit, and that cools the measurement sample unit; and
    a support unit provided for the heat generating source unit, the measurement sample unit, and the heat cooling source unit,
    wherein the heat generating source unit, the measurement sample unit, the heat cooling source unit, and the support unit are sequentially stacked,
    the measurement sample unit has a three-layer structure consisting of an object to be measured for estimating thermal characteristics, and heat conducting materials that sandwich the object,
    the heat conducting materials are adhered to the heat generating source unit and the heat cooling source unit through a reducing agent for a value of interfacial contact thermal resistance comprising a heat-transfer promoting agent therebetween,
    the object to be measured for estimating the thermal characteristics has a sample embedded in a hardened material from an un-crosslinked liquid-silicone liquiform rubber composition, and the object to be measured for estimating the thermal characteristics and the heat conducting materials are adhered to one another through at least one of physical contact, chemical contact, and chemical bond contact, and are contacted in the measurement sample unit, and
    the heat-transfer promoting agent includes:
        high purity water selected from the group consisting of heavy water, distilled water, and ion-exchanged water, and
        at least one selected from the group consisting of:
        (i) a surface active agent selected from the group consisting of a cationic surfactant, a nonionic surfactant, an anionic surfactant, and an ampholytic surfactant,
        (ii) a water-soluble polymer selected from the group consisting of carboxy methyl cellulose, polyethylene glycol, and polyvinyl alcohol,
        (iii) a builder selected from the group consisting of sodium sulfate, sodium sulfite, sodium carbonate, ammonium sulfite, ammonium carbonate, sodium phosphate, sodium silicate, ammonium silicate, ammonium phosphate, sodium phosphite, ammonium phosphite, sodium nitrate, sodium nitrite, ethylenediaminetetraacetic acid, ethylenediamine, and ammonium ethylenediaminetetraacetate, and
        (iv) a metallic surface stabilizer selected from the group consisting of triazine trithiol metallic salt, benzotriazole hydrochloride, ethylenediaminetetraacetic acid, ethylenediaminetetraacetic acid-lactic acid, resorcin, t-butylphenol, and aminophenyl aniline.

2. The measurement device for estimating the thermal characteristics according to claim 1, further comprising a length measuring device which measures at least one of a thickness of the measurement sample unit and the object to be measured for estimating the thermal characteristics.

3. The measurement device for estimating the thermal characteristics according to claim 1, wherein the heat generating source unit consists of a heat insulation material, a heat generating source that indwells with joining to an insulating resin which contacts the heat insulation material, and a metallic block which contacts the insulating resin at a side of the measurement sample unit, and
    the heat insulation material, the heat generating source and the metallic block are sequentially stacked, and contacting thereof is bonding by a molecular adhesive agent.

4. The measurement device for estimating the thermal characteristics according to claim 1, wherein the measurement sample unit is the three-layer structure consisting of the heat conducting materials of two metallic plates, and the object to be measured for estimating the thermal characteristics sandwiched therebetween, and
    the heat conducting materials of the two metallic plates and the object to be measured are adhered through at least one of the physical contact, the chemical contact, and the chemical bond contact.

5. The measurement device for estimating the thermal characteristics according to claim 1, wherein at least one of thermal spaces, which have a permissible value of thermal resistance, a permissible affectedness of volatility, independence of pressurization, and independence of distance of a gap, are provided between the measurement sample unit and a metallic block in the heat generating source unit which contacts thereto, and between the measurement sample unit and a metallic block in the heat cooling source unit which contacts thereto.

6. The measurement device for estimating the thermal characteristics according to claim 1, wherein at least one of thermal spaces, which have a permissible value of thermal resistance, a permissible affectedness of volatility, independence of pressurization, and independence of distance of a gap, are provided between the heat conducting material in the measurement sample unit and a metallic block in the heat generating source unit which contacts thereto, and between the heat conducting material in the measurement sample unit and a metallic block in the heat cooling source unit which contacts thereto, and the thermal spaces are filled with the heat-transfer promoting agent.

7. The measurement device for estimating the thermal characteristics according to claim 1, wherein the heat conducting materials and the object to be measured for estimating the thermal characteristics are adhered through at least one of the chemical contact through a heat-transfer promoting agent and the chemical bond contact through a molecular adhesive agent.

8. The measurement device for estimating the thermal characteristics according to claim 1, wherein the measurement sample unit is the three-layer structure, and the object to be measured for estimating the thermal characteristics is a piece or plural pieces of measuring sheets having a thickness in a range of 0.001 mm to 20 mm per piece.

9. The measurement device for estimating the thermal characteristics according to claim 1, wherein the measurement sample unit has a single set or stacked plural sets of the three-layer structure in which the object to be measured for estimating the thermal characteristics is sandwiched between the heat conducting materials.

10. The measurement device for estimating the thermal characteristics according to claim 1, wherein the measurement sample unit has a single set or stacked plural sets of the three-layer structure.

11. The measurement device for estimating the thermal characteristics according to claim 1, wherein the measurement device measures a value of a contact thermal resistance between the object to be measured for estimating the thermal characteristics and the heat conducting materials in the three-layer structure, and a value of a thermal resistance and a thermal conductivity of the object to be measured for estimating the thermal characteristics, as standard average values of an identical object to be measured for estimating the thermal characteristics, the object to be measured for estimating the thermal characteristics is a piece or plural pieces of measuring sheets having in a range of 0.001 mm to 10 mm per piece, the values of the contact thermal resistance and the thermal resistance of the object to be measured for estimating the thermal characteristics are in a range of $0.001*10^{-3}$ m$^2$K/W to 1 m$^2$K/W, and the thermal conductivity of the object to be measured for estimating the thermal characteristics is in a range of 0.01 W/mK to 20 W/mK.

12. The measurement device for estimating the thermal characteristics according to claim 1, wherein the measurement device is used for measuring a value of a contact thermal resistance between the object to be measured for estimating the thermal characteristics and the heat conducting materials in the three-layer structure, and a value of a thermal resistance and a thermal conductivity of the object to be measured for estimating the thermal characteristics, as standard average values of an identical object to be measured for estimating the thermal characteristics, stacked plural sets of the three-layer structure are stacked at most 5 units, and an applied layer of the heat-transfer promoting agent having in a range of 5 mg/4.84 cm$^3$ to 20 mg/4.84 cm$^3$ is provided between the object to be measured for estimating the thermal characteristics and the heat conducting materials, and between the plural units of the three-layer structure, and the value of the thermal resistance is a total value of a thermal resistance of the objects to be measured for estimating the thermal characteristics within a range of 0.01 MPa to 3 MPa of pressure of a contacted surface on the stacked plural sets of the three-layer structure.

13. The measurement device for estimating the thermal characteristics according to claim 1, further comprising a load unit which is provided with a load measurement device, and which applies a load onto the measurement sample unit.

14. The measurement device for estimating the thermal characteristics according to claim 13, wherein the load unit has a load cell that conducts the load onto the object to be measured for estimating the thermal characteristics, and a circuit that converts deformation which is detected in the load cell by the load measurement device into a voltage.

15. A measurement method for estimating thermal characteristics comprising:

measuring the thermal characteristics of a value of a contact thermal resistance, a value of a thermal resistance, and a thermal conductivity of an object to be measured for estimating the thermal characteristics using a measurement device for estimating the thermal characteristics comprising:

a measurement sample unit;

a heat generating source unit that has heat sensors for detecting heat radiating toward the measurement sample unit, and that heats the measurement sample unit;

a heat cooling source unit that has heat sensors for detecting heat radiating from the measurement sample unit, and that cools the measurement sample unit; and a support unit provided for the heat generating source unit, the measurement sample unit, and the heat cooling source unit, wherein the heat generating source unit, the measurement sample unit, the heat cooling source unit, and the support unit are sequentially stacked;

adhering the heat conducting materials to the heat generating source unit and the heat cooling source unit through a reducing agent for a value of interfacial contact thermal resistance comprising a heat-transfer promoting agent therebetween, preparing a three-layer structure consisting of an object to be measured for estimating the thermal characteristics, and the heat conducting materials that sandwich the object so that the measurement sample unit has the three-layer structure, adhering the object to be measured for estimating the thermal characteristics to the heat conducting materials through at least one of physical contact, chemical contact, and chemical bond contact, and then, measuring the thermal characteristics, wherein the heat-transfer promoting agent includes:

high purity water selected from the group consisting of heavy water, distilled water, and ion-exchanged water, and at least one selected from the group consisting of:

(i) a surface active agent selected from the group consisting of a cationic surfactant, a nonionic surfactant, an anionic surfactant, and an ampholytic surfactant, (ii) a water-soluble polymer selected from the group consisting of carboxy methyl cellulose, polyethylene glycol, and polyvinyl alcohol, (iii) a builder selected from the group consisting of sodium sulfate, sodium sulfite, sodium carbonate, ammonium sulfite, ammonium carbonate, sodium phosphate, sodium silicate, ammonium silicate, ammonium phosphate, sodium phosphite, ammonium phosphite, sodium nitrate, sodium nitrite, ethylenediaminetetraacetic acid, ethylenediamine, and ammonium ethylenediaminetetraacetate, and (iv) a metallic surface stabilizer selected from the group consisting of triazine trithiol metallic salt, benzotriazole hydrochloride, ethylenediaminetetraacetic acid, ethylenediaminetetraacetic acid-lactic acid, resorcin, t-butylphenol, and aminophenyl aniline.

16. A heat radiation method on the measurement method for estimating thermal characteristics according to claim 15, further comprising radiating heat in the three-layer structure, which is extracted from a cohort of manufacturing lots thereof or any one of the cohort of manufacturing lots, and which consists of an object to be measured for estimating the thermal characteristics, and heat conducting materials that sandwich and adhere the object through the at least one of the physical contact, the chemical contact, and the chemical bond contact, wherein the three-layer structure is sandwiched between a heat generating source material and a heat cooling source material, and is used for a portion in any one selected from an electric material, an electronic material, a printed-wiring assembly for a semiconductor component, a motor, a lighting equipment, an automobile supply, and a radiating material.

17. A reducing agent for a value of interfacial contact thermal resistance comprising a heat-transfer promoting agent, the heat-transfer promoting agent including:

high purity water selected from the group consisting of heavy water, distilled water, and ion-exchanged water; and at least one selected from the group consisting of:
(i) a surface active agent selected from the group consisting of a cationic surfactant, a nonionic surfactant, an anionic surfactant, and an ampholytic surfactant;
(ii) a water-soluble polymer selected from the group consisting of a carboxy methyl cellulose, polyethylene glycol, and polyvinyl alcohol;
(iii) a builder selected from the group consisting of sodium sulfate, sodium sulfite, sodium carbonate, ammonium sulfite, ammonium carbonate, sodium phosphate, sodium silicate, ammonium silicate, ammonium phosphate, sodium phosphite, ammonium phosphite, sodium nitrate, sodium nitrite, ethylenediaminetetraacetic acid, ethylenediamine, and ammonium ethylenediaminetetraacetate; and
(iv) a metallic surface stabilizer selected from the group consisting of triazine trithiol metallic salt, benzotriazole hydrochloride, ethylenediaminetetraacetic acid, ethylenediaminetetraacetic acid-lactic acid, resorcin, t-butylphenol, and aminophenyl aniline, wherein the reducing agent is suitable for use in a measurement device for estimating thermal characteristics comprising:

a measurement sample unit, a heat generating source unit that has heat sensors for detecting heat radiating toward the measurement sample unit, and that heats the measurement sample unit, a heat cooling source unit that has heat sensors for detecting heat radiating from the measurement sample unit, and that cools the measurement sample unit, the measurement sample unit has a three-layer structure consisting of an object to be measured for estimating thermal characteristics, and heat conducting materials that sandwich the object, the heat conducting materials are adhered to the heat generating source unit and the heat cooling source unit through a reducing agent for a value of interfacial contact thermal resistance comprising a heat-transfer promoting agent therebetween, and the object to be measured for estimating the thermal characteristics has a sample embedded in a hardened material from an un-crosslinked liquid-silicone liquiform rubber composition, and the object to be measured for estimating the thermal characteristics and heat conducting materials are adhered to one another through at least one of physical contact, chemical contact, and chemical bond contact, and are contacted in the measurement sample unit.

* * * * *